US012442483B2

(12) United States Patent
Jin et al.

(10) Patent No.: US 12,442,483 B2
(45) Date of Patent: Oct. 14, 2025

(54) CLAMPING ASSEMBLY, CLAMPING DEVICE, GIMBAL AND STABILIZER

(71) Applicant: REALSEE (BEIJING) TECHNOLOGY CO., LTD., Beijing (CN)

(72) Inventors: Sha Jin, Beijing (CN); Fanhua Meng, Beijing (CN); Yuzhu Zheng, Beijing (CN)

(73) Assignee: REALSEE (BEIJING) TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/278,617

(22) PCT Filed: Feb. 21, 2022

(86) PCT No.: PCT/CN2022/077129
§ 371 (c)(1),
(2) Date: Aug. 23, 2023

(87) PCT Pub. No.: WO2023/056269
PCT Pub. Date: Apr. 6, 2023

(65) Prior Publication Data
US 2024/0240744 A1    Jul. 18, 2024

(51) Int. Cl.
*F16M 11/04* (2006.01)
*F16B 2/12* (2006.01)
(Continued)

(52) U.S. Cl.
CPC ............. *F16M 11/041* (2013.01); *F16B 2/12* (2013.01); *F16M 11/045* (2013.01);
(Continued)

(58) Field of Classification Search
CPC .. F16M 11/041; F16M 11/045; F16M 11/046; F16M 11/2064; F16M 13/04;
(Continued)

(56) References Cited

U.S. PATENT DOCUMENTS 5,903,645 A * 5/1999 Tsay .................... B60R 11/0241
248/316.4
6,302,617 B1 * 10/2001 Rumpp ................... F16B 21/02
403/348

(Continued)

FOREIGN PATENT DOCUMENTS

CN    207407012 U    5/2018
CN    209120252 U    7/2019
(Continued)

*Primary Examiner* — Monica E Millner
(74) *Attorney, Agent, or Firm* — Enable IP, P.C.

(57) ABSTRACT

The present disclosure provides a clamping assembly, a clamping device, a gimbal and a stabilizer. The clamping assembly (100) includes a supporting member (110), having a snap-fit groove (111); and a clamping member (160), configured to clamp the mobile device (500), wherein the clamping member (160) includes a snap-fit structure that is detachably snap-fitted with the snap-fit groove (111), the clamping member (160) is detachably connected with the supporting member (110), which is not only reliable in connection, but also does not require disassembly and assembly of screws, so that the stability of the clamping device for clamping the mobile device and the operation convenience can be improved.

19 Claims, 28 Drawing Sheets

(51) Int. Cl.
*F16M 11/20* (2006.01)
*F16M 13/04* (2006.01)
*G03B 17/56* (2021.01)
*H04M 1/04* (2006.01)

(52) U.S. Cl.
CPC ....... *F16M 11/046* (2013.01); *F16M 11/2064* (2013.01); *F16M 13/04* (2013.01); *G03B 17/561* (2013.01); *H04M 1/04* (2013.01); *F16M 2200/021* (2013.01); *F16M 2200/027* (2013.01)

(58) Field of Classification Search
CPC ........ F16M 2200/021; F16M 2200/027; F16B 2/12; H04M 1/04; G03B 17/561
See application file for complete search history.

(56) References Cited

U.S. PATENT DOCUMENTS

| | | | | |
|---|---|---|---|---|
| 7,647,676 B2 * | 1/2010 | Carnevali | ........... | B60R 11/0252 |
| | | | | 379/426 |
| 8,282,060 B2 * | 10/2012 | Fan | ...................... | F16M 11/041 |
| | | | | 361/679.21 |
| 8,490,937 B2 * | 7/2013 | Crain | .................... | F16M 11/041 |
| | | | | 248/316.4 |
| 8,870,143 B2 * | 10/2014 | Kubin | .................. | F16M 11/041 |
| | | | | 248/222.52 |
| 9,936,823 B2 * | 4/2018 | Galant | ............... | G08B 13/1409 |
| 10,198,036 B2 * | 2/2019 | Wylie | ................... | G06F 1/1654 |
| 11,319,731 B1 * | 5/2022 | Kelsch | ................ | E05B 73/0082 |
| 2014/0168890 A1 * | 6/2014 | Barnard | ................ | G06F 1/1626 |
| | | | | 248/181.2 |
| 2014/0209777 A1 * | 7/2014 | Klemin | .................. | F16M 13/04 |
| | | | | 29/525.08 |
| 2021/0033950 A1 * | 2/2021 | Thomas | ............. | F16M 11/2028 |

FOREIGN PATENT DOCUMENTS

| | | |
|---|---|---|
| CN | 209375724 U | 9/2019 |
| CN | 210050550 U | 2/2020 |
| CN | 110896650 A | 3/2020 |
| CN | 111120817 A | 5/2020 |
| CN | 211176245 U | 8/2020 |
| CN | 212480652 U | 2/2021 |
| CN | 215259090 U | 12/2021 |
| CN | 215488657 U | 1/2022 |
| CN | 215529073 U | 1/2022 |
| CN | 215847855 U | 2/2022 |
| EP | 1160499 A1 | 12/2001 |

* cited by examiner

CLAMPING ASSEMBLY, CLAMPING DEVICE, GIMBAL AND STABILIZER

CROSS-REFERENCE TO RELATED APPLICATIONS

This application is a National Phase Application under 35 U.S.C. § 371 of International Application No. PCT/CN2022/077129, filed Feb. 21, 2022, and claims the priority of Chinese Utility Model Patent Application No. 202121420205.7 titled "GIMBAL AND STABILIZER, filed Jun. 24, 2021, Chinese Utility Model Patent Application No. 202121774099.2 titled "CLAMPING ASSEMBLY AND CLAMPING DEVICE FOR CLAMPING MOBILE DEVICE," filed Jul. 30, 2021, Chinese Utility Model Patent Application No. 202121888395.5 titled "CLAMPING ASSEMBLY AND CLAMPING DEVICE FOR CLAMPING MOBILE DEVICE," filed Aug. 12, 2021, and Chinese Utility Model Patent Application No. 202122086306.1 titled "CLAMPING MECHANISM AND CLAMPING DEVICE FOR CLAMPING MOBILE DEVICE," filed Aug. 31, 2021, the contents of which are incorporated by reference herein in their entireties for all purposes.

FIELD

The present disclosure relates to the field of clamping devices, in particular to a clamping assembly, a clamping device, a gimbal and a stabilizer.

BACKGROUND

Some clamping devices in the related art, such as gimbals, selfie sticks, etc., may be used to clamp the mobile device such as mobile phones, so as to facilitate users to use the mobile device, or provide a relatively stable use state for the mobile device.

The stability of the clamping device for clamping mobile device and the operation convenience are the keys to determine whether it may be widely accepted by consumers.

SUMMARY

According to an aspect of the present disclosure, a clamping assembly is provided, comprising: a supporting member and a clamping member. The supporting member has a snap-fit groove; the clamping member is configured to clamp the mobile device, the clamping member includes a snap-fit structure that is detachably snap-fitted with the snap-fit groove.

According to one aspect of the present disclosure, a clamping device is provided, comprising the clamping assembly of the above-mentioned aspect.

According to an aspect of the present disclosure, a gimbal is provided, comprising: the clamping assembly of the above-mentioned aspect, a first cantilever, a second cantilever, a first locking mechanism, a second locking mechanism, and a machine body assembly; the first cantilever includes a first guiding structure for providing guidance in a first guiding direction; the second cantilever slidably assembled with the first guiding structure, and includes a second guiding structure for providing guidance in a second guiding direction, where the second guiding direction is orthogonal to the first guiding direction, and the clamping assembly is slidably assembled with the second guiding structure; the first locking mechanism is configured to lock the sliding of the second cantilever relative to the first guiding structure; the second locking mechanism is configured to lock the sliding of the clamping assembly relative to the second guiding structure; the machine body assembly is provided with a first driving mechanism and a second driving mechanism, and the first driving mechanism is configured to drive the first cantilever to rotate around a first axis, and the second driving mechanism is configured to drive the machine body assembly to rotate around a second axis, where the first axis is arranged along the first guiding direction, and the second axis is arranged along the second guiding direction.

According to an aspect of the present disclosure, a stabilizer is provided, comprising a gimbal of the above-mentioned aspect.

According to the embodiments described hereinafter, these and other aspects of the present disclosure will be clearly understood and will be clarified with reference to the embodiments described below.

BRIEF DESCRIPTION OF THE DRAWINGS

Further details, features and advantages of the present disclosure are disclosed in the following description of exemplary embodiments with reference to the accompanying figures. In the figures.

DESCRIPTION OF THE PREFERRED EMBODIMENTS

Figure 1:
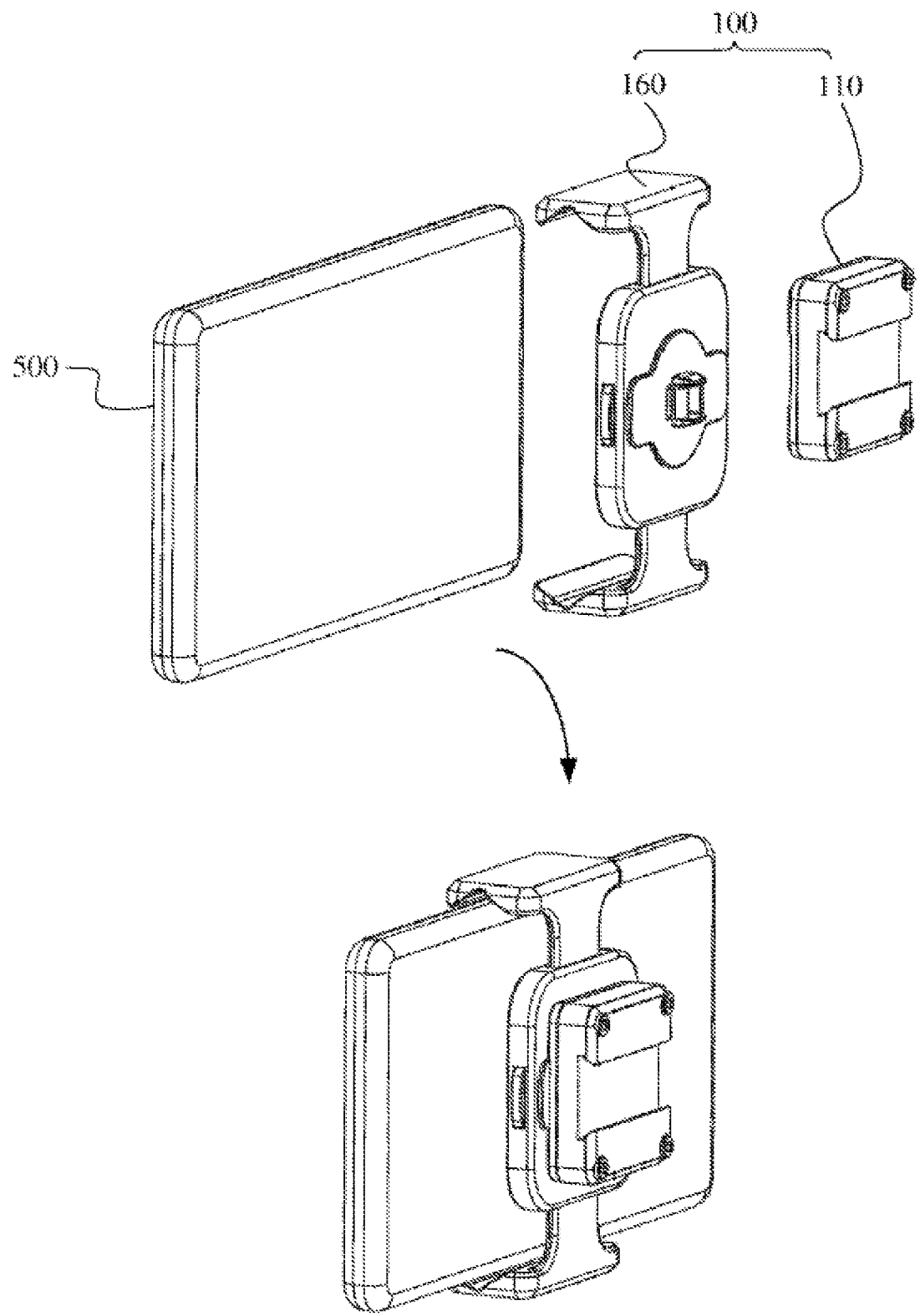
FIG. 1 is a schematic diagram of a clamping assembly clamping mobile device according to some embodiments of the present disclosure.

Hereinafter, only some exemplary embodiments are briefly described. As those skilled in the art would realize, the described embodiments may be modified in various different ways without departing from the spirit or scope of the present disclosure. Accordingly, the drawings and descriptions are to be regarded as illustrative in nature and not restrictive.

The clamping device for clamping a mobile phone in some related technologies known to the inventors of the present disclosure includes a body part and a clamping part that is magnetically connected to the main body part and can rotate relative to the bod part, where the clamping part is used for clamping the mobile phone. Through a magnetic connection between the clamping part and the body part, the mobile phone may be fixed on the clamping device; by rotating the clamping part relative to the body part at a certain angle, the clamping direction of the mobile phone on the clamping device may be adjusted. However, when this clamping device is in use, there is a risk that the clamping part will fall off together with the mobile phone, and the clamping direction of the mobile phone on the clamping device cannot be stably maintained at an ideal clamping angle.

Another clamping device in the related art known to the inventors of the present disclosure includes a body part and a clamping part in a detachable fixed connection with the body part by screws and can adjust a fixed angle relative to the body part, where the clamping part is used to clamp the mobile phone. Through the fixed connection between the clamping part and the body part, the fixing of the mobile phone on the clamping device can be realized; by adjusting the fixed angle of the clamping part relative to the body part, the adjustment of the clamping direction of the mobile phone on the clamping device can be realized. Although this clamping device may reliably fix the clamping part and the body part by screws, when the clamping direction of the mobile phone on the clamping device needs to be adjusted, the screw needs to be removed, which is extremely inconvenient to be operated.

Based on this, according to embodiments of the present disclosure, a clamping assembly and a clamping device including the clamping assembly are provided, so that the stability of the clamping device for clamping mobile device and the operation convenience are improved. A specific type of the clamping device is not limited, for example, it may be a gimbal, a stabilizer, a selfie stick, a desktop support or a bedside support for the mobile device. The specific product type of the mobile device is not limited, for example, it may be a mobile phone, a tablet computer, or a portable camera device.

The clamping assembly provided by the embodiments of the present disclosure includes a supporting member and a clamping assembly, where the supporting member has a snap-fit groove, the clamping assembly is configured to clamp the mobile device, and the clamping member includes a snap-fit structure that is detachably snap-fitted with the snap-fit groove.

In the technical solution of the embodiment of the present disclosure, the clamping member and the supporting member are connected by detachably clamping, which is not only reliable in connection, but also does not require disassembly and assembly of screws. As compared with the above-mentioned related technologies, the stability of the clamping device for clamping the mobile device and the operation convenience can be improved.

The clamping assembly of the present disclosure will be further described in detail through some specific embodiments below.

Figure 2:
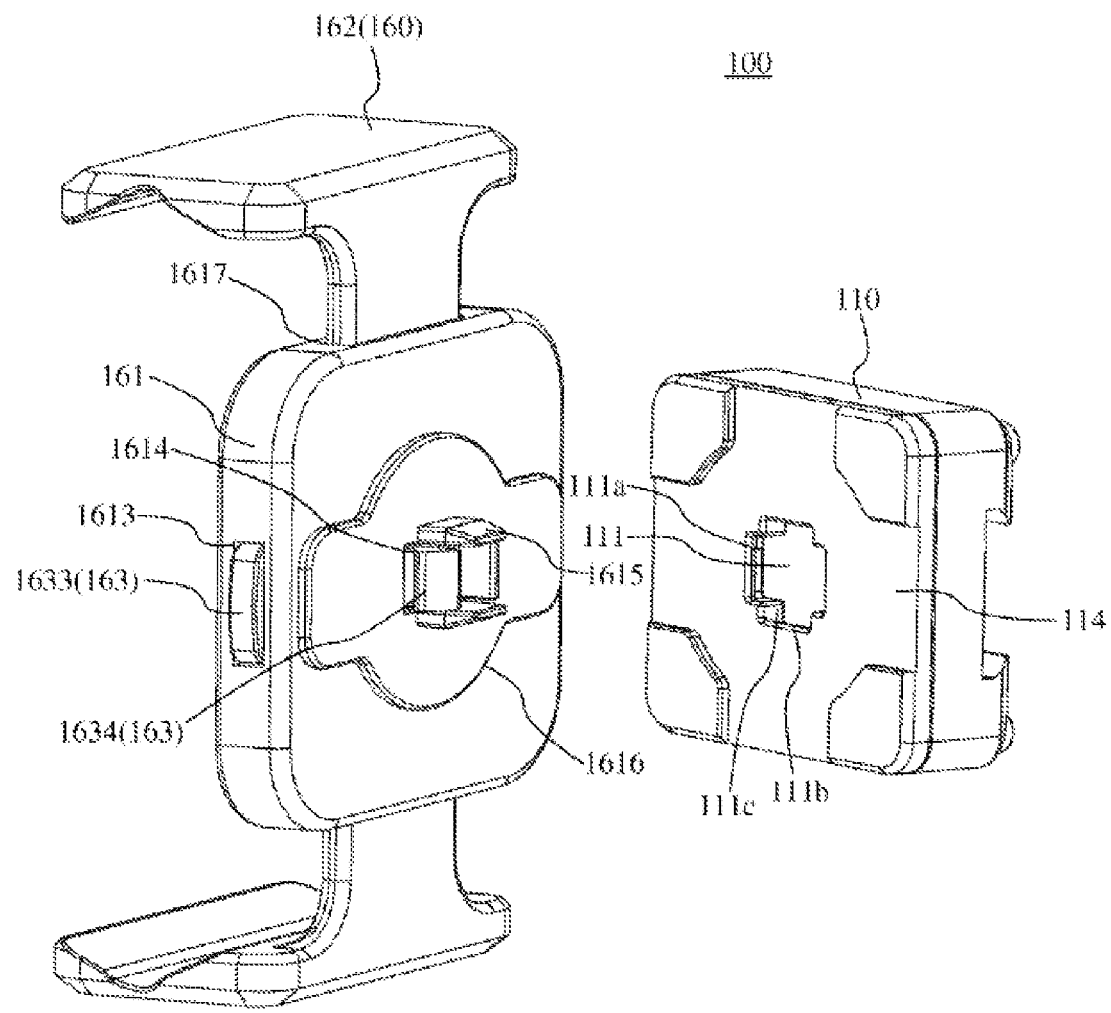
FIG. 2 is a schematic diagram of a clamping assembly according to some embodiments of the present disclosure.
Figure 3:
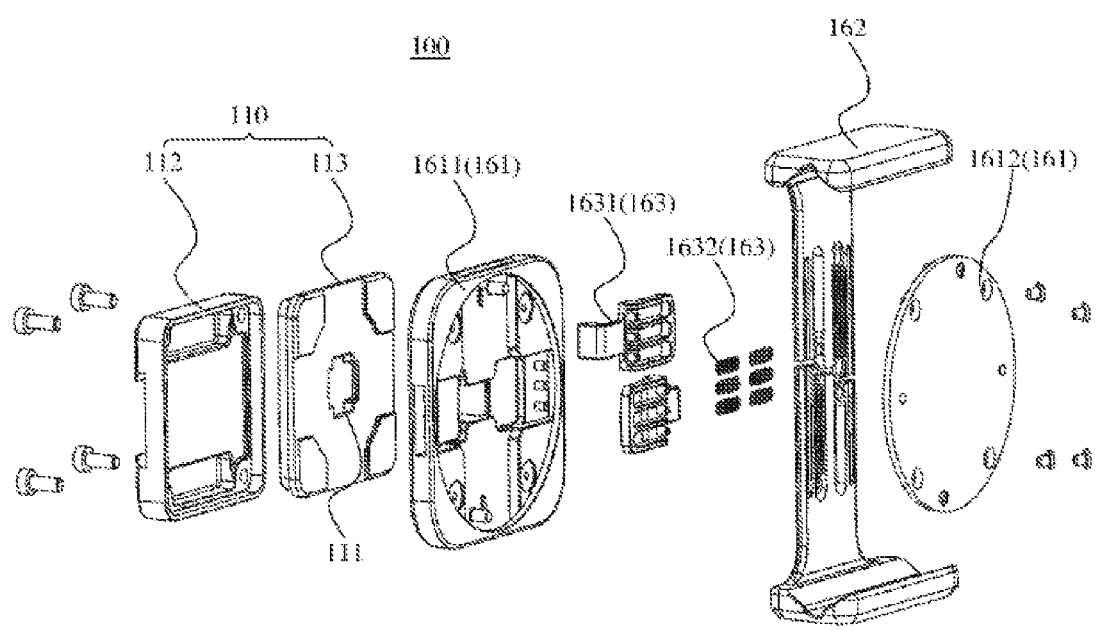
FIG. 3 is an exploded view of a clamping assembly according to some embodiments of the present disclosure.
Figure 4:
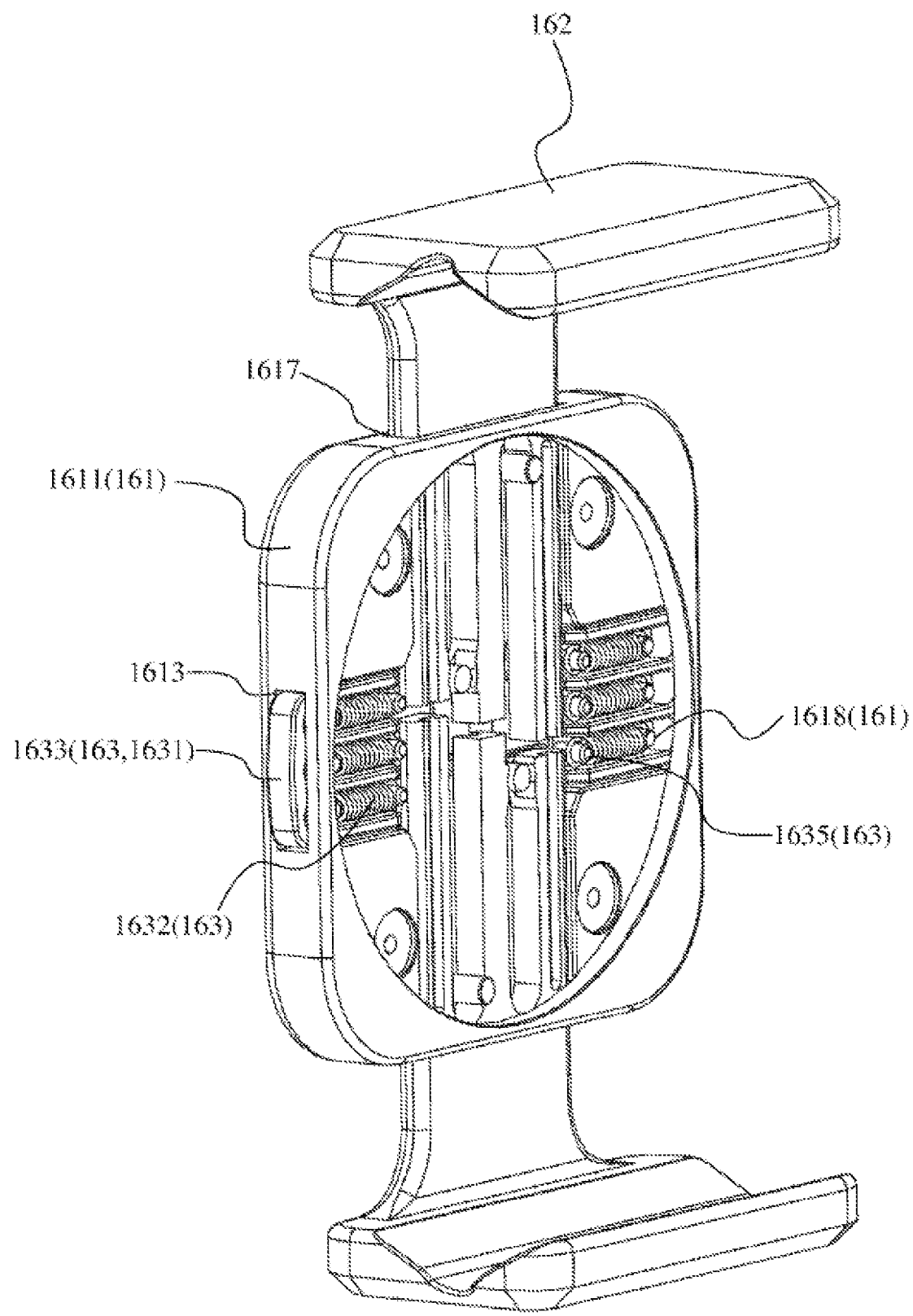
FIG. 4 is a schematic diagram of a partially assembled clamping assembly according to some embodiments of the present disclosure.
Figure 5:
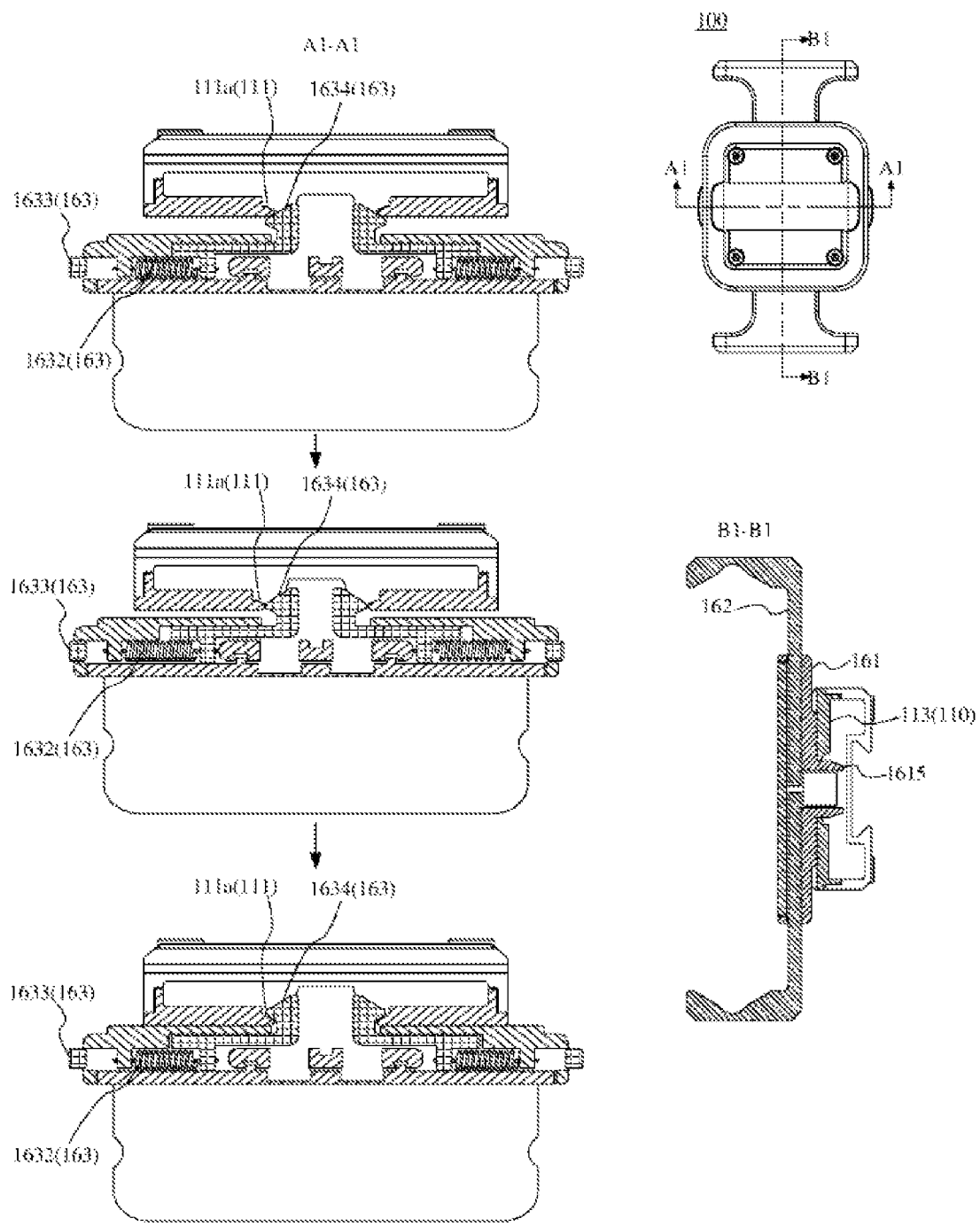
FIG. 5 is a rear view of a clamping assembly and cross-sectional views thereof along directions of A1-A1 and B1-B1 according to some embodiments of the present disclosure.

As shown in FIGS. 1 to 5, FIG. 1 is a schematic diagram of a clamping assembly clamping mobile device according to some embodiments of the present disclosure, FIG. 2 is a schematic diagram of a clamping assembly according to some embodiments of the present disclosure, FIG. 3 is an exploded view of a clamping assembly according to some embodiments of the present disclosure, FIG. 4 is a schematic diagram of a partially assembled clamping assembly according to some embodiments of the present disclosure, and FIG. 5 is a rear view of a clamping assembly and cross-sectional views thereof along directions of A1-A1 and B1-B1 according to some embodiments of the present disclosure.

The clamping assembly 100 provided by some embodiments of the present disclosure, as a partial structure of the clamping device, includes a supporting member 110 and a clamping member 160. The supporting member 110 is used for assembling with other structures of the clamping device. The supporting member 110 has a snap-fit groove 111, and the snap-fit groove 111 includes a first snap groove 111a arranged along a first direction. The clamping member 160 includes a housing 161, clamping jaws 162 and a button 163d. The housing 161 includes a first hole 1613 and a second hole 1614. The clamping jaws 162 are disposed on the housing 161 and configured to clamp the mobile device 500. The button 163 includes a button body 1631 and a tension spring 1632. The button body 1631 includes a pressing part 1633 operable through the first hole 1613 and a snap part 1634 extending from the second hole 1614. The tension spring 1632 connects the button body 1631 and the housing 161. The snap part 1634 may stretch the tension spring 1632 under the action of an external force and snap-fit with the first snap groove 111a. When the pressing part 1633 is pressed, the snap part 1634 may also stretch the tension spring 1632 and break away from the first snap groove 111a. The first direction may be vertical or horizontal. In this embodiment, the snap part 1634 serves as a snap-fit structure of the clamping member 160 for detachably snap-fitting with the snap-fit groove 111.

The number of buttons 163 may be set to one, two or more as required. In this embodiment of the present disclosure, the number of buttons 163 is two and arranged opposite to each other. Correspondingly, the number of the first holes 1613 is two and the number of the first snap grooves 111a is two, both of which are set in one-to-one correspondence with the two buttons 163. The snap openings of the snap parts 1634 of the two buttons 163 are facing away from each other, and the snap parts 1634 of the two buttons 163 may be snap-fitted with the two first snap grooves 111a in one-to-one correspondence. If the number of buttons 163 is designed to be two or more, they need to act simultaneously during operation. The present disclosure is only described when the number of buttons 163 is two.

Referring to FIGS. 1 and 5, when it is necessary to fix the mobile device 500 on the clamping device, first two clamping ends of the clamping jaws 162 are stretched, and the mobile device 500 is clamped therein; then, the snap parts 1634 of the two buttons 163 are aligned with the snap-fit groove 111, and the clamping member 160 is pressed toward the supporting member 110 as a whole, so that the snap parts 1634 of the two buttons 163 slides into the two first snap grooves 111a in one-to-one correspondence, thereby being snap-fitted with the two first snap grooves 111a. During this process, the tension springs 1632 of the two buttons 163 are firstly stretched, and the snap parts 1634 of the two buttons 163 are reset with the two first snap grooves 111a in one-to-one correspondence after being clamped. After this process is completed, the fixing of the mobile device 500 on the clamping device is completed.

After the mobile device 500 is clamped into the clamping jaw 162, pressing parts 1633 of the two buttons 163 may also be pressed, and the snap parts 1634 of the two buttons 163 are sent into the two first snap grooves 111a in one-to-one correspondence, and then the pressing parts 1633 of the two buttons 163 are released.

When it is necessary to remove the mobile device from the clamping device, firstly the pressing parts 1633 of the two buttons 163 are pressed, so that the snap parts 1634 of the two buttons 163 stretch the tension spring 1632 and break away from the corresponding first snap groove 111a, and at this time, the clamping member 160 may be separated from the supporting member 110; then, the two clamping ends of the clamping jaws 162 may be stretched to remove the mobile device.

As compared with the related technology, the clamping assembly in the embodiment of the present disclosure realizes the clamping and separation between the clamping member and the supporting member through the button that may be pressed elastically, the structure is simple and reliable, and the operation convenience is high. As compared with the above-mentioned first related technology, the mobile device may be stably clamped and hardly rotated. As compared the above-mentioned second related technology, there is no need to disassemble the screws, and the operation convenience is greatly improved.

In this embodiment of the present disclosure, as shown in FIG. 2, the snap-fit groove 111 further includes two second snap grooves 111b arranged along a second direction, and the second direction is orthogonal to the above-mentioned first direction. The snap parts 1634 of the two buttons 163 may not only be snap-fitted with the two first snap grooves 111a in one-to-one correspondence, but also may be snap-fitted with the two second snap grooves 111b in one-to-one correspondence. The button body 1631 and the housing 161 may be connected by at least two tension springs 1632.

The design of this embodiment can realize the adjustment of the clamping direction of the mobile device. For example, by taking the mobile device as a mobile phone as an example, when the mobile phone needs to be clamped horizontally, the snap parts 1634 of the two buttons 163 should be clamped into the two first snap grooves 111a in one-to-one correspondence, and when the mobile phone needs to be clamped vertically, the clamping member 160 is removed and rotated by 90°, and then the snap parts 1634 of the two buttons 163 are clamped into the two second snap grooves 111b in one-to-one correspondence. With the design of this embodiment, the clamping direction of the mobile phone can be flexibly adjusted, and the operation is simple and convenient.

In addition, when it is necessary to separate the clamping member 160 from the supporting member 110, the pressing parts 1633 of the two buttons 163 are pressed at the same time, so that the clamping of the snap parts 1634 of the two buttons 163 are relieved from the corresponding snap grooves, and at this time, the clamping member 160 is released. Since the clamping assembly 100 is subjected to a relatively balanced pressing force, and the respective forces of the supporting member 110 and the clamping member 160 are also relatively balanced, the structure of the clamping assembly 100 is more reliable and durable, and the separation and clamping operations between the clamping member 160 and the supporting member 110 are also labor-saving and convenient. The buttons 163 may be made of an aluminum alloy button, which has better strength and texture, and is durable.

In this embodiment, the housing 161 is designed as a square housing, the two first holes 1613 are respectively located at two opposite ends of the square housing, and the pressing part 1633 is an arc-shaped pressing part. In this way, it is convenient to hold and take out the clamping member 160 and to press the button 163. In a reset state, the two buttons 163 respectively protrude from two opposite end planes of the square housing, which makes the pressing operation more convenient and the hand feel better. Of course, the specific shapes of the housing and the pressing part 1633 in the present disclosure are not limited thereto, and may be designed appropriately according to the specific application scenarios of the clamping assembly 100.

As shown in FIG. 4, in some embodiments, the square housing further includes two third holes 1617, the two third holes 1617 are respectively located at the other two opposite ends of the square housing, and the clamping jaws 162 pass through the two third holes 1617, and two clamping ends of the two third holes 1617 are located outside the square housing. The specific structure of the clamping jaws 162 is not limited, as long as the mobile device can be stably clamped. For example, the clamping jaws 162 may be elastic clamping jaws, and one or both clamping ends may be elastically stretched relative to the square housing.

As shown in FIG. 2, in some embodiments of the present disclosure, the snap-fit groove 111 has a cross shape, and includes four blocking protrusions 111c in addition to two first snap grooves 111a and two second snap grooves 111b, each blocking protrusion 111c is located between the adjacent first snap groove 111a and the second snap groove 111b. The housing 161 includes two positioning ribs 1615 located on an edge of the second hole 1614 and arranged opposite to each other. The two positioning ribs 1615 are perpendicular to an extending direction of the snap parts 1634 of the two buttons 163. When the snap parts 1634 of the two buttons 163 clamps with the two first snap grooves 111a in one-to-one correspondence or with the two second snap grooves 111b in one-to-one correspondence, rotation of the two positioning ribs 1615 are restricted in the snap-fit groove 111 by the four blocking protrusions 111c.

In this embodiment, through the cooperation of the positioning rib 1615 and the cross-shaped snap-fit groove 111, the relative rotation of the clamping member 160 and the supporting member 110 after being clamped may be prevented, so that the stability of the clamping device to clamp the mobile device is further improved. The sides of the two positioning ribs 1615 facing away from each other have guide slopes respectively. In this way, the two positioning ribs 1615 also have a guiding effect. When the clamping member 160 contacts with the supporting member 110, it enters the snap-fit groove 111, which is convenient for clamping member 160 to clamp and align with supporting member 110, and the resistance when the clamping assembly 160 is snap-fitted with the supporting member 110 can be reduced, making the clamping operation smoother and labor-saving, with a touch but less sound.

As shown in FIG. 2, in some embodiments of the present disclosure, a surface of the supporting member 110 facing the clamping member 160 has a substantially cross-shaped positioning groove 114; the housing 161 has a substantially cross-shaped positioning protrusion 1616, and the positioning protrusion 1616 may be clamped into the positioning groove 114 along the first direction and may be clamped into the positioning groove 114 along the second direction. The second hole 1614 is disposed at a center position of the positioning protrusion 1616.

In this embodiment, the cooperation between the positioning protrusion 1616 and the positioning groove 114 facilitates the positioning of the clamping member 160 and the supporting member 110 in the two clamping directions respectively, and also restricts the relative rotation of the clamping member 160 relative to the supporting member 110 to a certain extent, so that the stability of the clamping device clamping the mobile device and the operation convenience can be further improved.

A first magnet (not shown) may be provided inside the supporting member 110, a second magnet (not shown) may be provided inside the housing 161, and the supporting member 110 and the clamping member 160 may be magnetically adsorbed through the first magnet and the second magnet. With this design, the clamping member 160 and the supporting member 110 are further fixed by magnetic adsorption on the basis of being clamped, so that the clamping of the mobile device is more stable.

In some embodiments of the present disclosure, in order to facilitate the processing and assembly of various parts of the supporting member 110 and the clamping member 160, as shown in FIG. 3, the supporting member 110 includes a support body 112 and a support cover 113 fixedly connected by a set of screws, the structure of the snap-fit groove 111 is provided on the support cover 113. The housing 161 of clamping member 160 includes a square-plate body 1611 and a circular square-plate cover 1612 fixedly connected by a set of screws, and the buttons 163, the clamping jaws 162 and other structures are arranged between the square-plate body 1611 and the square-plate cover 1612.

As shown in FIGS. 3 and 4, the assembly process of the clamping assembly 100 is as follows: first, fixing the support body 112 and the support cover 113 together; then, putting the button body 1631 into an installation groove of the square-plate body 1611, snaping one end of the tension spring 1632 on a fixing post 1618 provided on the square-plate body 1611, and fixing the other end of the tension spring 1632 on the button post 1635 provided on the button body 1631, and at this time, causing the tension spring 1632 in an energy storage state of slight tension, so as to ensure that the button 163 can be assembled reliably; then, fixing the clamping jaw 162 on the square-plate body 1611 and be located on the top of the button 163; then, using a set of screws to fix the square-plate cover 1612 on the square-plate body 1611.

As shown in FIGS. 2 and 5, when the clamping member 160 and the supporting member 110 need to be assembled, firstly, the two positioning ribs 1615 with guiding slopes of the clamping member 160 and the snap-fit groove 111 are roughly positioned, and at this time, the snap parts 1634 of the two buttons 163 start to contact with an edge of the snap-fit groove 111; the clamping member 160 is pressed toward the supporting member 110, and the snap parts 1634 of the two buttons 163 pulls the two button bodies 1631 close to each other and further elongates the tension spring 1632, and when the snap parts 1634 of the two buttons 163 are about to enter their corresponding snap grooves (the first snap groove 111a or the second snap groove 111b), the tension spring 1632 is stretched to the maximum; the clamping member 160 is pressed toward the supporting member 110 until the snap parts 1634 of the two buttons 163 completely enter the corresponding snap grooves (the first snap groove 111a or the second snap groove 111b), that is, the snap-fitting with the snap groove is completed, and at this time, the tension spring 1632 resets and shortens, but is still in a slight tension state to ensure reliable clamping for difficult loosening. Up to now, the clamping assembly of the clamping member 160 and the supporting member 110 is completed.

In addition, when the clamping member 160 is assembled with the supporting member 110, the pressing parts 1633 of the two buttons 163 may also be pressed to send the snap parts 1634 of the two buttons 163 into the respective corresponding snap grooves (the first snap groove 111a or the second snap groove 111b) and then the pressing part 1633 is released.

When it is necessary to disassemble and separate the clamping member 160 from the supporting member 110, firstly the pressing part 1633 of the two buttons 163 is pressed, so that the two snap parts 1634 stretch the tension spring 1632 and break away from the corresponding snap groove, and at this time, the snap-fit groove 111 will no longer interfere with the supporting member 110, and the clamping member 160 is released so as to easily separate from the supporting member 110.

When it is necessary to adjust the clamping direction of the mobile device, the clamping member 160 is removed with reference to the above steps, then is rotated by 90° and then is reassembled with the supporting member 110.

According to some embodiments of the present disclosure, a clamping device is provided, including the clamping assembly 100 of the embodiments shown in FIGS. 1 to 5. The specific type of the clamping device is not limited, for example, it may be a gimbal, a stabilizer, a selfie stick, a desktop support or a bedside support for mobile device. The clamping device can achieve stable clamping of the mobile device, and become more convenient to be operated.

Figure 6:
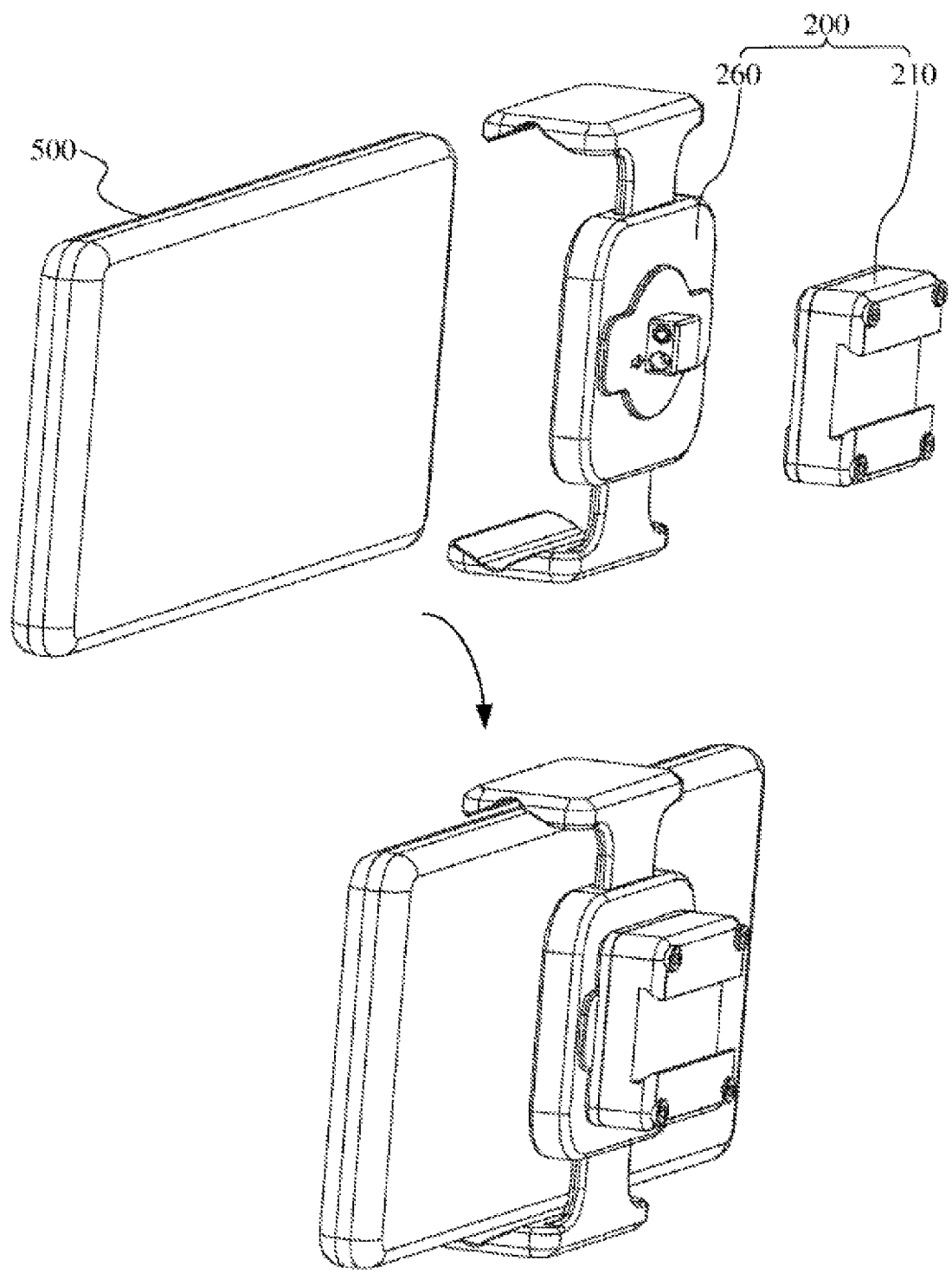
FIG. 6 is a schematic diagram of a clamping assembly clamping mobile device according to other embodiments of the present disclosure.
Figure 7:
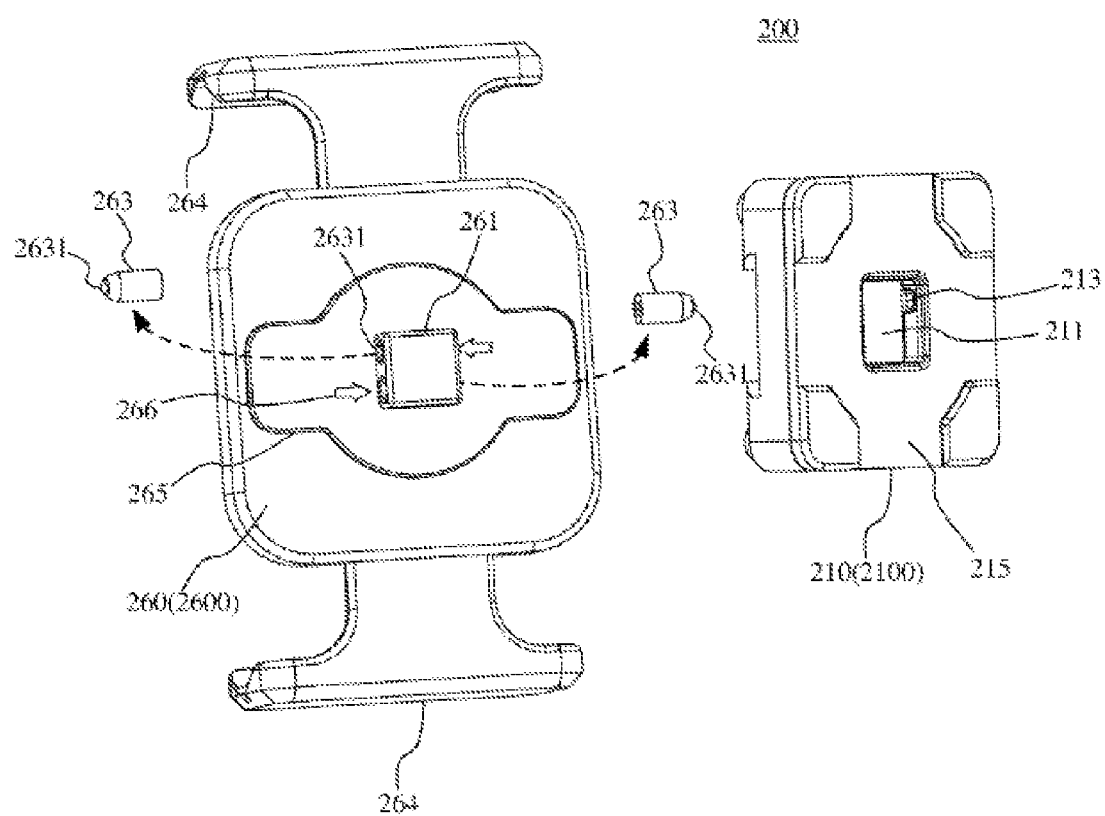
FIG. 7 is a schematic diagram of a clamping assembly according to other embodiments of the present disclosure.
Figure 8:
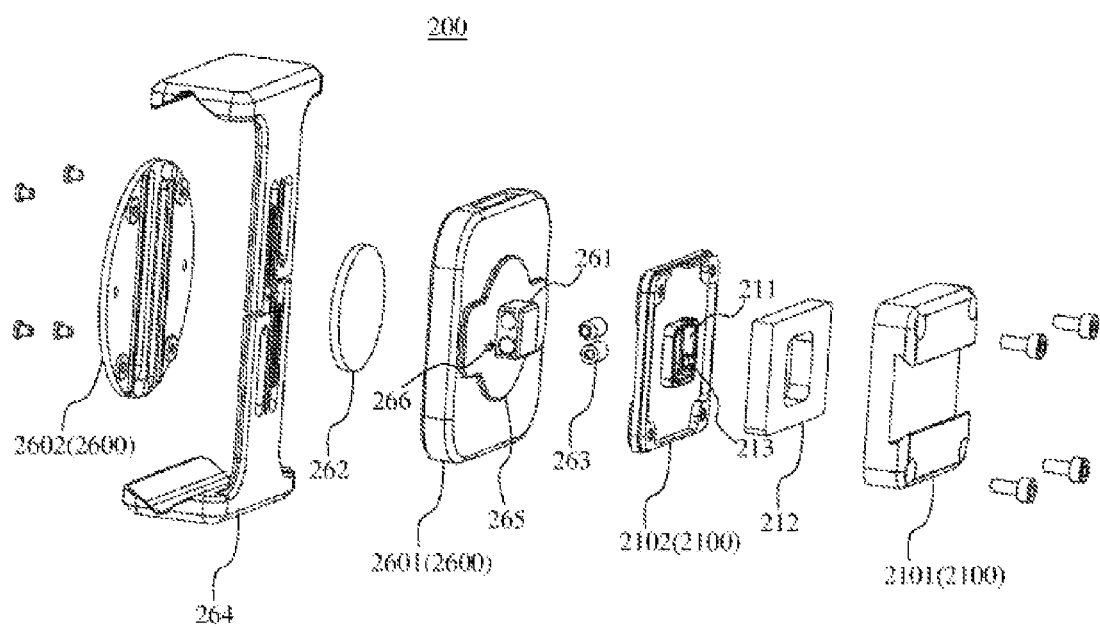
FIG. 8 is an exploded view of a clamping assembly according to other embodiments of the present disclosure.
Figure 9:
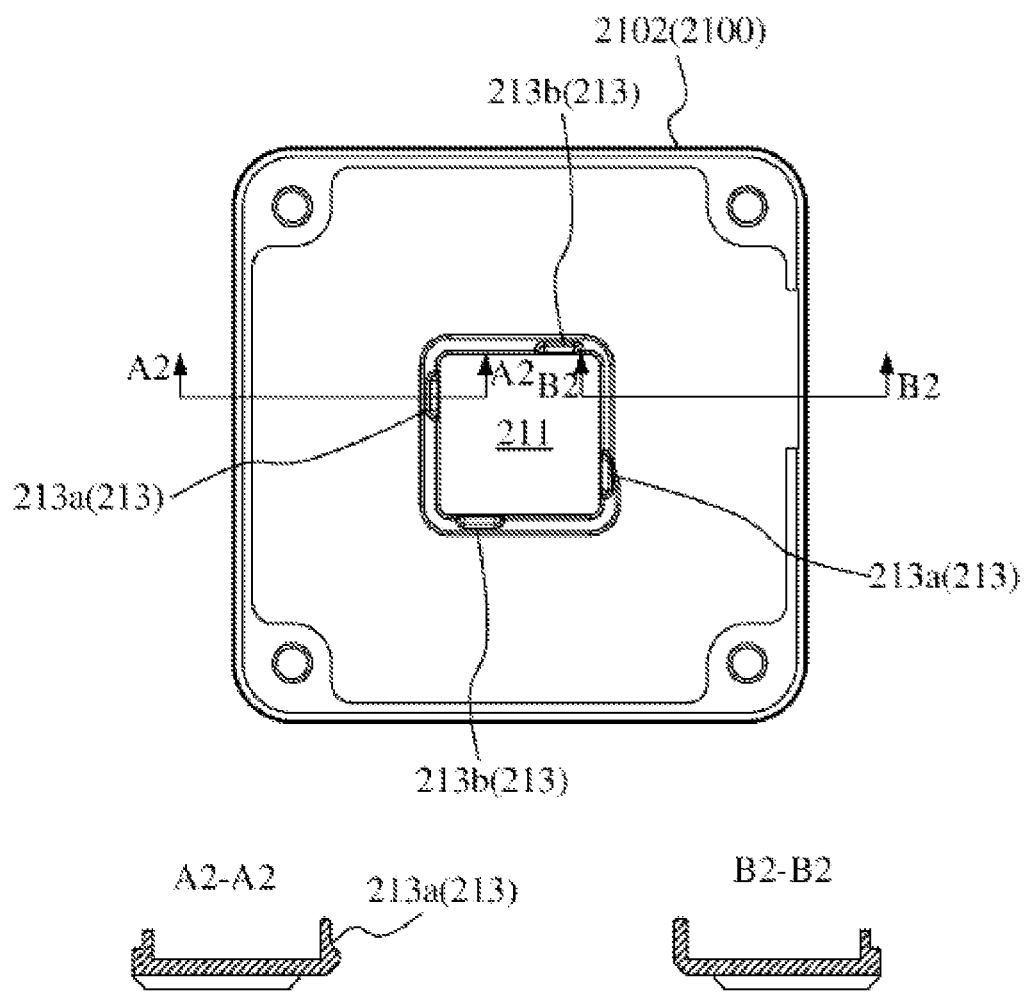
FIG. 9 is a front view of an internal structure of a first body and its cross-sectional views along the directions of A2-A2 and B2-B2 according to other embodiments of the present disclosure.
Figure 10:
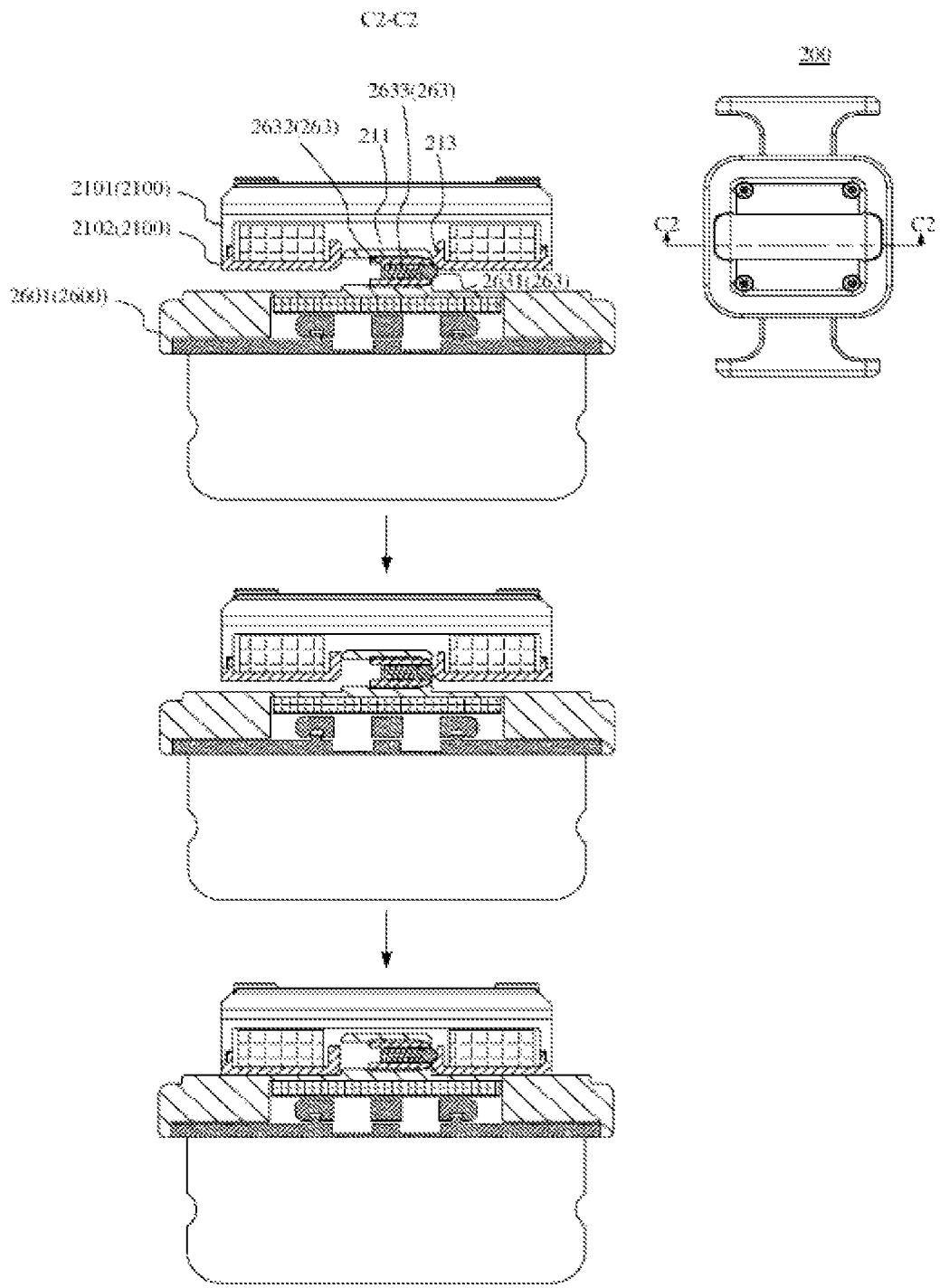
FIG. 10 is a rear view of a clamping assembly and a cross-sectional view along a direction of C2-C2 according to other embodiments of the present disclosure.

As shown in FIGS. 6 to 10, FIG. 6 is a schematic diagram of a clamping assembly clamping mobile device according to other embodiments of the present disclosure, FIG. 7 is a schematic diagram of a clamping assembly according to other embodiments of the present disclosure, FIG. 8 is an exploded view of a clamping assembly according to other embodiments of the present disclosure, FIG. 9 is a front view of an internal structure of a first body and its cross-sectional views along the directions of A2-A2 and B2-B2 according to other embodiments of the present disclosure, and FIG. 10 is a rear view of a clamping assembly and a cross-sectional view along a direction of C2-C2 according to other embodiments of the present disclosure.

A clamping assembly 200 provided by the embodiment of the present disclosure, as a partial structure of the clamping device, includes a supporting member 210 and a clamping member 260. The supporting member 210 is used for assembling with other structures of the clamping device. The supporting member 210 includes a first body 2100 and a first magnet 212 disposed on the first body 2100, the first body 2100 has a snap-fit groove 211, and a sidewall of the snap-fit groove 211 has at least one ball snap-fit groove 213 (such as four ball snap-fit grooves 213 shown in the figures). The clamping member 260 includes a second body 2600, a second magnet 262 disposed on the second body 2600 and capable of magnetically adsorbing the first magnet 212, clamping jaws 264 disposed on the second body 2600 and configured to clamp the mobile device 500, and at least one ball screw 263 (such as two ball screws 263 shown in the figures), where the second body 2600 has a protruding part 261 that may be inserted into the snap-fit groove 211, and the above-mentioned at least one ball screw 263 is arranged based on the protruding part 261, the ball 2631 of each ball screw 263 may be clamped into the ball snap-fit groove 213. In this embodiment, the ball screw 263 is used as a snap-fit structure of the clamping member 260 for detachably snap-fitting with the snap-fit groove 211.

In the embodiment of the present disclosure, the assembly of the clamping member 260 and the supporting member 210 is realized through the magnetic adsorption of the first magnet 212 and the second magnet 262 and the clamping of the ball screw 263 and the ball snap-fit groove 213. The structure is simple and reliable, the operation is easy, and the operation convenience is higher.

Referring to FIG. 10, the structure of the ball screw 263 generally includes a hollow cylinder 2632 with an external thread, and a spring 2633 and a ball 2631 disposed in the hollow cylinder 2632. The ball 2631 compresses the spring 2633 and retracts into the hollow cylinder 2632 when being pressed, and the ball 2631 protrudes out of the hollow cylinder 2632 under the action of the spring 2633 after the pressure is released. The clamping of the ball screw 263 and the ball snap-fit groove 213 can prevent the clamping member 260 from rotating relative to the supporting member 210, and can prevent the clamping member 260 from accidentally detaching from the supporting member 210 (that is, detaching from the supporting member 210 during non-manual operation). As compared with the above-mentioned first related technology, the mobile device can be stably clamped and hardly rotated. As compared with the above-mentioned second related technology, there is no need to disassemble the screws, and the operation convenience is greatly improved. In order to make the ball 2631 smoothly slide into the ball snap-fit groove 213 and avoid accidentally slipping out of the ball snap-fit groove 213, the ball snap-fit groove 213 may be designed to have a certain shape of the guide arc surface.

Referring to FIGS. 6, 7 and 10, when it is necessary to fix the mobile device 500 on the clamping device, first two clamping ends of the clamping jaw 264 are stretched, and the mobile device 500 is clamped into the clamping jaw 264; then, the protruding part 261 of the clamping member 260 is aligned with the snap-fit groove 211, and at this time, the supporting member 210 and the clamping member 260 may be adsorbed together by the first magnet 212 and the second magnet 262, under the action of the adsorption force, the balls 2631 of each ball screw 263 are also clamped into the ball snap-fit grooves 213 respectively. Of course, the clamping member 260 may also be pushed toward the supporting member 210 as a whole, so as to help the clamping member 260 to adsorb to the supporting member 210 and help the ball screw 263 to snap-with with the ball snap-fit groove 213. After this process is completed, the fixing of the mobile device 500 on the clamping device is completed.

When it is necessary to remove the mobile device 500 from the clamping device, a suction force between the first magnet 212 and the second magnet 262 and the elastic force of the spring 2633 of the ball screw 263 are overcome, and the clamping member 260 is pulled out from the supporting member 210 without using other auxiliary tools, and the operation is very simple. The clamping member 260 and the supporting member 210 may be disassembled repeatedly without affecting the reliability of the structure, and the wear is relatively small, so the service life of the clamping assembly 200 is relatively long.

In the embodiment of the present disclosure, there is no specific limitation on the number of the ball snap-fit groove 213 and the number of the ball screws 263, and the number of the two may be the same or different. For example, the above-mentioned at least one ball screw 263 may include at least two ball screws 263 (such as the two ball screws 263 shown in the figures) whose screwing directions on the protruding part 261 are not completely the same. As the number of ball screws 263 increases, the fixing of the clamping assembly 260 on the supporting member 210 is more secure, and the operating force for separating the clamping assembly 260 from the supporting member 210 is also greater. The number of ball screws 263 may be appropriately selected and designed accordingly based on the installation requirements of the mobile device. In addition, the number of the ball screws 263 may be only one.

In the embodiment of the present disclosure, as shown in FIGS. 7 and 9, the above-mentioned at least one ball snap-fit groove 213 may include at least one first ball snap-fit groove 213a (for example, the two first ball snap-fit grooves 213a shown in the figure) and at least one second ball snap-fit groove 213b (such as the two second ball snap-fit grooves 213b shown in the figures), the above-mentioned at least one ball screw 263 (such as the two ball screws 263 shown in the figures) may be snap-fitted with the at least one first ball snap-fit groove 213a in one-to-one correspondence, and the clamping member 260 is rotated by 90° relative to the supporting member 210 (for example, rotated by 90° clockwise or rotated by 90° counterclockwise), and then is snap-fitted with the at least one second ball snap-fit grooves 213*b* in one-to-one correspondence. In this embodiment, the number of the ball snap-fit grooves 213 is twice the number of the ball screws 263.

The design of this embodiment can realize the adjustment of the clamping direction of the mobile device. For example, by taking an example that the mobile device is a mobile phone, when the mobile phone needs to be clamped horizontally, while the supporting member 210 and the clamping member 260 are adsorbed, the above-mentioned at least one ball screw 263 is clamped into the above-mentioned at least one first ball snap-fit groove 213*a*; when the mobile phone needs to be clamped vertically, the clamping member 260 is removed and rotated by 90° clockwise or rotated by 90° counterclockwise, and then the supporting member 210 and the clamping member 260 are adsorbed while at least one of the above-mentioned ball screws 263 are clamped into the above-mentioned at least one ball snap-fit grooves 213*b* in one-to-one correspondence. With the design of this embodiment, the clamping direction of the mobile phone can be flexibly adjusted, and the operation is simple and convenient.

As shown in FIGS. 7 and 9, in this embodiment, the above-mentioned at least one ball snap-fit groove 213 includes two first ball snap-fit grooves 213*a* and two second ball snap-fit grooves 213*b*; the above-mentioned at least one ball screw 263 includes two ball screws 263 whose screw directions on the protruding part 261 are opposite. The two ball screws 263 may be engaged with the two first ball slots 213*a* in one-to-one correspondence, and engages with the two second ball snap-fit grooves 213*b* in a one-to-one correspondence after being rotated by 90° relative to the supporting member 210 with the clamping member 260 (for example, rotated by 90° clockwise or rotated by 90° counterclockwise). The structure is simple and reliable, and the stability is high.

In some embodiments of the present disclosure, only one clamping direction may also be designed for the clamping assembly, so that the numbers of the ball snap-fit grooves and the ball screws may be designed to be the same, for example, two respectively.

The shape of the protruding part 261 matches the shape of the snap-fit groove 211. The specific shape of the protruding part 261 is not limited, for example, it may be approximately circular, square, polygonal, etc. When the clamping assembly 200 has two orthogonal clamping directions, the shapes of the protruding part 261 and the snap-fit groove 211 should satisfy that the protruding part 261 may still be inserted into the snap-fit groove 211 after being rotates by 90° relative to the supporting member 210 with the clamping member 260 (for example, rotated by 90° clockwise or 90° counterclockwise). The roughly square snap-fit groove 211 not only facilitates assembly and alignment, but also restricts the protruding part 261 from rotating therein. Therefore, the stability of the clamping device for clamping the mobile device and the operation convenience can be further improved. In the present disclosure, the structure is generally in a certain shape. It may be understood that after ignoring some details and/or errors, the structure as a whole presents this shape, for example, it may include this shape or a shape that is relatively close to this shape, and should not be understood in a narrow sense.

As shown in FIGS. 7 and 9, in this embodiment, the protruding part 261 is a square protruding part, the axes of the two ball screws 263 are arranged in parallel, and the balls 2631 of the two ball screws 263 expose to two opposite ends of the square protruding parts in one-to-one correspondence. Correspondingly, the snap-fit groove 211 is a square snap-fit groove, and the two first ball snap-fit grooves 213*a* are arranged on two opposite sidewalls of the square snap-fit groove in one-to-one correspondence, and the two second ball snap-fit grooves 213*b* is provided on the other two opposite sidewalls of the square snap-fit groove in one-to-one correspondence. In order to make the structure of the protruding part 261 more compact, two ball screws 263 may be arranged antiparallel. In other embodiments of the present disclosure, the two ball screws may also be arranged on opposite coaxial lines, which is not specifically limited in the present disclosure.

As shown in FIG. 8, in some embodiments of the present disclosure, the first body 2100 is a first housing (for example, including a support body 2101 and a support cover 2102), the snap-fit groove 211 protrudes from an inner wall of the first housing, and the first magnet 212 is disposed in the first housing and surrounds the snap-fit groove 211 in a ring shape. The second body 2600 is a second housing (such as including a square-plate body 2601 and a square-plate cover 2602), and the second magnet 262 is arranged in the second housing and is located in a recess formed by a positioning protrusion 265 on the inner wall of the second housing. This design can make the overall structure of the clamping assembly 200 more compact, and the first housing and the second housing are, for example, plastic housings or sheet metal housings. The first magnet and the second magnet are not limited to the design of the above shape and position, for example, in some other embodiments of the present disclosure, the first magnet may further include a plurality of first magnet patches attached to the surface of the first body, the second magnet includes a plurality of second magnet patches attached to the surface of the second body, and each second magnet patch is configured to be adsorbed correspondingly to one first magnet patch.

As shown in FIG. 7, in some embodiments of the present disclosure, the surface of the supporting member 210 facing the clamping member 260 has a substantially cross-shaped positioning groove 215, and the second body 2600 has a substantially cross-shaped positioning protrusion 265. The positioning protrusion 265 may be clamped into the positioning groove 215 along the first direction and into the positioning groove 215 along the second direction, and the protruding part 261 is disposed at the center of the positioning protrusion 265. The first direction and the second direction may be orthogonal, for example, the first direction is a horizontal direction, and the second direction is a vertical direction. The above-mentioned "cross shape" includes a cross shape and shapes close to cross shape, and should not be understood in a narrow sense.

In this embodiment, the cooperation between the positioning protrusion 265 and the positioning groove 215 facilitates the positioning of the clamping member 260 and the supporting member 210 in the two clamping directions respectively, and also restricts the relative rotation of the clamping member 260 relative to the supporting member 210 to a certain extent, therefore, the stability of the clamping device clamping the mobile device and the operation convenience can further be improved. In this embodiment, in order to facilitate the assembly of the ball screw 263, the surface of the positioning protrusion 265 may be provided with an indication sign 266 on the screwing direction of the ball screw, such as the arrow pattern shown in the figure.

In some embodiments, the second housing (that is, the second body 2600) is approximately square, and its two opposite ends are respectively provided with through holes, the clamping jaws 264 pass through the two through holes, and its two clamping ends are located outside the second housing. The specific structural form of the clamping jaw 264 is not limited, as long as it can realize stable clamping of the mobile device, for example, the clamping jaw 264 may be an elastic clamping jaw, where one clamping end or two clamping ends may be elastically stretched relative to the second housing.

Figure 11:
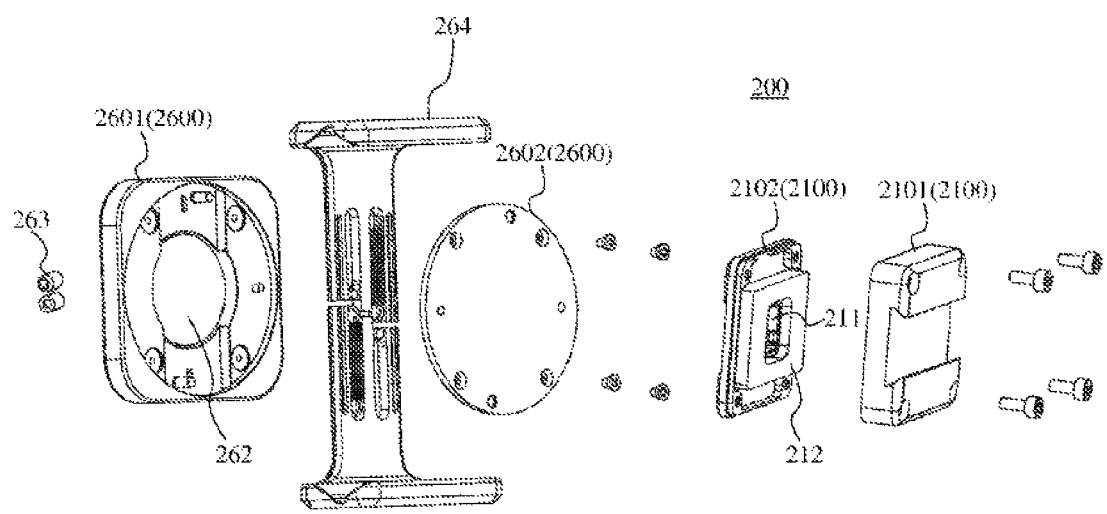
FIG. 11 is a schematic diagram of a partially assembled clamping assembly according to other embodiments of the present disclosure.
Figure 12:
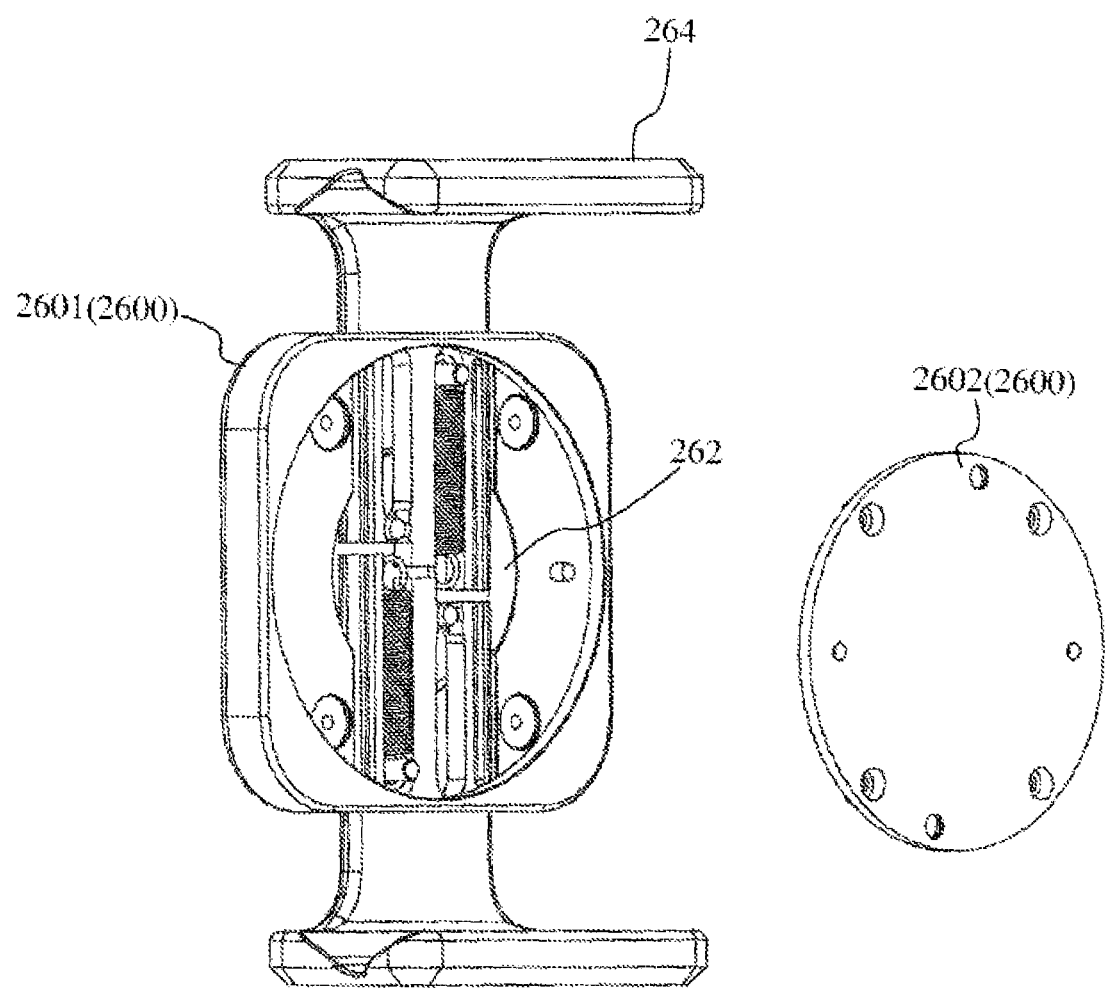
FIG. 12 is a schematic diagram of a partially assembled clamping assembly according to other embodiments of the present disclosure.
Figure 13:
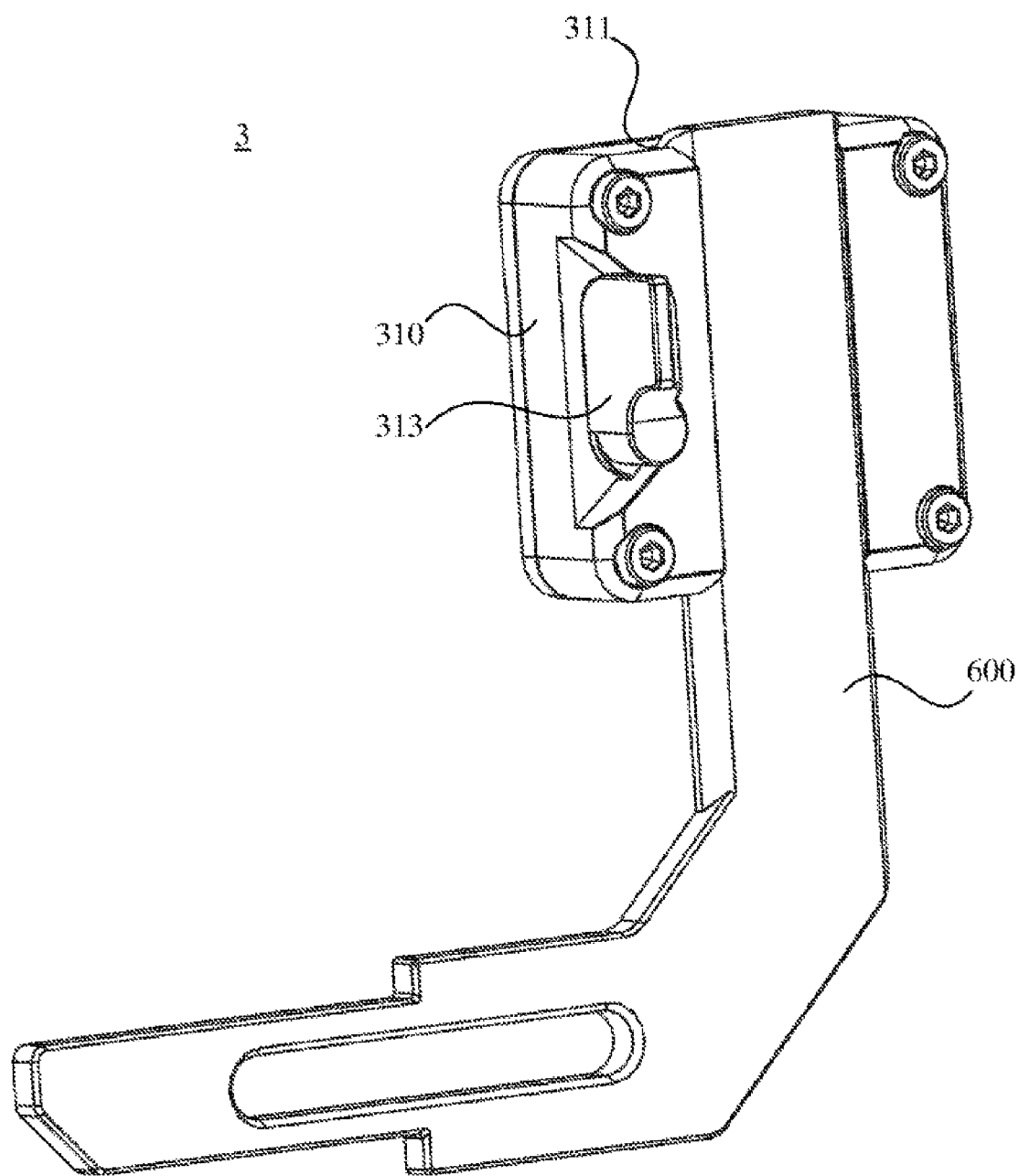
FIG. 13 is a schematic diagram of a three-dimensional structure of a clamping assembly according to some embodiments of the present disclosure.

As shown in FIGS. 8, 11 and 12, FIG. 11 is a schematic diagram of a partially assembled clamping assembly according to other embodiments of the present disclosure, and FIG. 12 is a schematic diagram of a partially assembled clamping assembly according to other embodiments of the present disclosure. In some embodiments of the present disclosure, in order to facilitate the processing and assembly of various parts of the supporting member 210 and the clamping member 260, the first housing (namely the first body 2100) of the supporting member 210 includes a support body 2101 and a support cover 2102 fixedly connected by a set of screws. The structure of the snap-fit groove 211 is provided on the support cover 2102. The second housing (i.e. the second body 2600) of the clamping member 260 includes a square-plate body 2601 and a circular square-plate cover 2602 fixedly connected by a set of screws, and structures such as the clamping jaws 264 and the second magnet 262 are arranged between the square-plate body 2601 and the square-plate cover 2602, structures such as the protruding part 261 and ball screws 263 are arranged on the square-plate body 2601.

As shown in FIGS. 8, 11 and 12, in an embodiment, the assembly process of the clamping assembly 200 is as follows: firstly, fixing the ring-shaped first magnet 212 to the inside of the support cover 2102 and the peripheral side of the structure of the snap-fit groove 211 through adhesives, and fixing the second magnet 262 into the recess inside the square-plate body 2601 through adhesives; then, fixing the support body 2101 and the support cover 2102 together by a set of screws; then, fixing the clamping jaws 264 to the inside of the square-plate body 2601 and the side of the second magnet 262 away from the protruding part 261, and fixing the square-plate body 2601 and the square-plate cover 2602 together by a set of screws; then, screwing two ball screws 263 into the protruding part 261 of the square-plate body 2601 according to the direction indicated by the indicating arrow. Up to now, the assembly of the clamping assembly 200 is completed. It may be understood that, in the above assembly process, the sequence of some steps may be adjusted.

As shown in FIGS. 7 and 10, when the clamping member 260 and the supporting member 210 need to be assembled, first the protruding part 261 of the clamping member 260 and the snap-fit groove 211 are roughly positioned, and at this time, the ball 2631 has not yet been compressed, therefore, the ball protrudes from the hollow cylinder 2632; the clamping member 260 is pushed toward the supporting member 210 as a whole, and at this time, the ball 2631 is squeezed into the hollow cylinder 2632 by the sidewall of the snap-fit groove 211; when the ball screw 263 moves to the position of the ball snap-fit groove 213, the pressure of the ball 2631 is relieved, and the elastic force of the spring 2633 pushes out the ball 2631, so that the ball protrudes out of the hollow cylinder 2632 again, and then clamps into the ball snap-fit groove 213. In the above process, the adsorption force between the first magnet 212 and the second magnet 262 makes the clamping member 260 and the supporting member 210 always have a tendency of adsorption and bonding, therefore, the clamping member 260 and the supporting member 210 may also be reliably connected by adsorption after the ball 2631 is clamped into the ball snap-fit groove 213.

When it is necessary to separate the clamping member 260 from the supporting member 210, the clamping member 260 is pulled out from the supporting member 210 to overcome the suction force between the first magnet 212 and the second magnet 262 and the spring force of the ball screw 263.

The first magnet 212 and the second magnet 262 may provide a stable adsorption force for the clamping member 260 and the supporting member 210. The clamping of the ball screw 263 and the ball snap-fit groove 213 may prevent the clamping member 260 from rotating relative to the supporting member 210, and may avoid that the clamping member 260 accidentally detaches from the supporting member 210. It may be seen from the above operation steps that the assembly and disassembly of the clamping member 260 and the supporting member 210 are very convenient, and the structure is also reliable and durable.

The clamping device provided by some embodiments of the present disclosure includes the clamping assembly 200 of the embodiment shown in FIGS. 6 to 12. The specific type of the clamping device is not limited, for example, it may be a gimbal, a stabilizer, a selfie stick, a desktop support for mobile device, or a bedside support for mobile device. The clamping device can achieve stable clamping of the mobile device, and is more convenient to be operated.

The inventors of the present disclosure also know a clamping device in the related art, which includes a bracket, a clamping module slidingly assembled with the bracket, and an adjusting screw, where the clamping module is configured to clamp a mobile phone, and the screw is configured to lock the sliding of the clamping module relative to the bracket. When it is necessary to adjust the position of the clamping module on the bracket, it is necessary to use a special tool to loosen the adjustment screw, and after the position is adjusted, a special tool is used to tighten the adjustment screw. By using this clamping device, the adjustment operation of the clamping module on the bracket is extremely inconvenient, and it is easy to cause the adjustment screw to slip.

Figure 14:
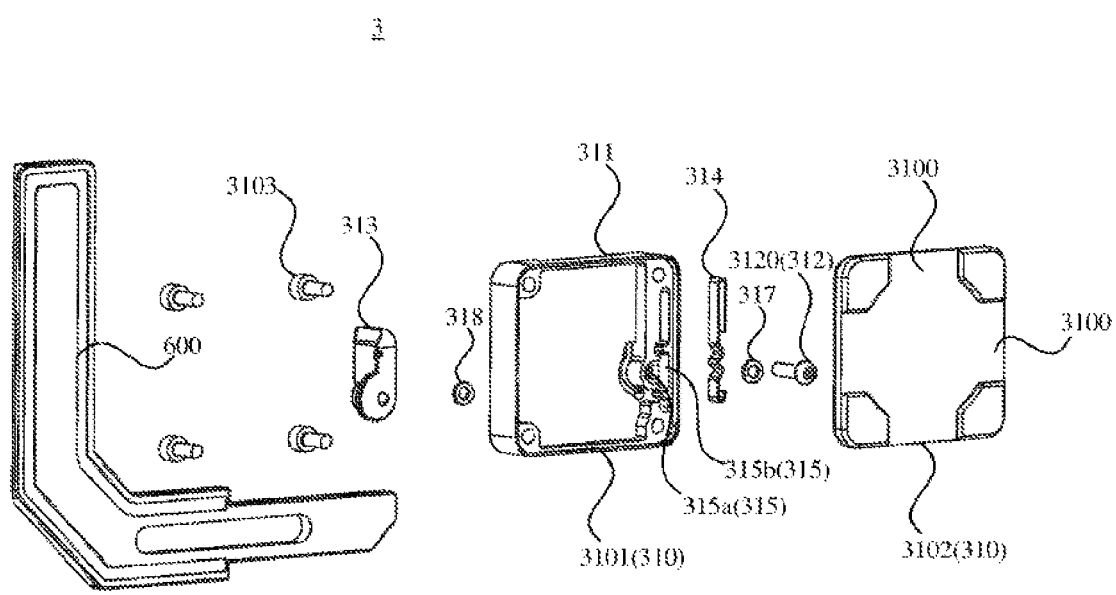
FIG. 14 is a schematic diagram of an exploded structure of a clamping assembly according to some other embodiments of the present disclosure.
Figure 15:
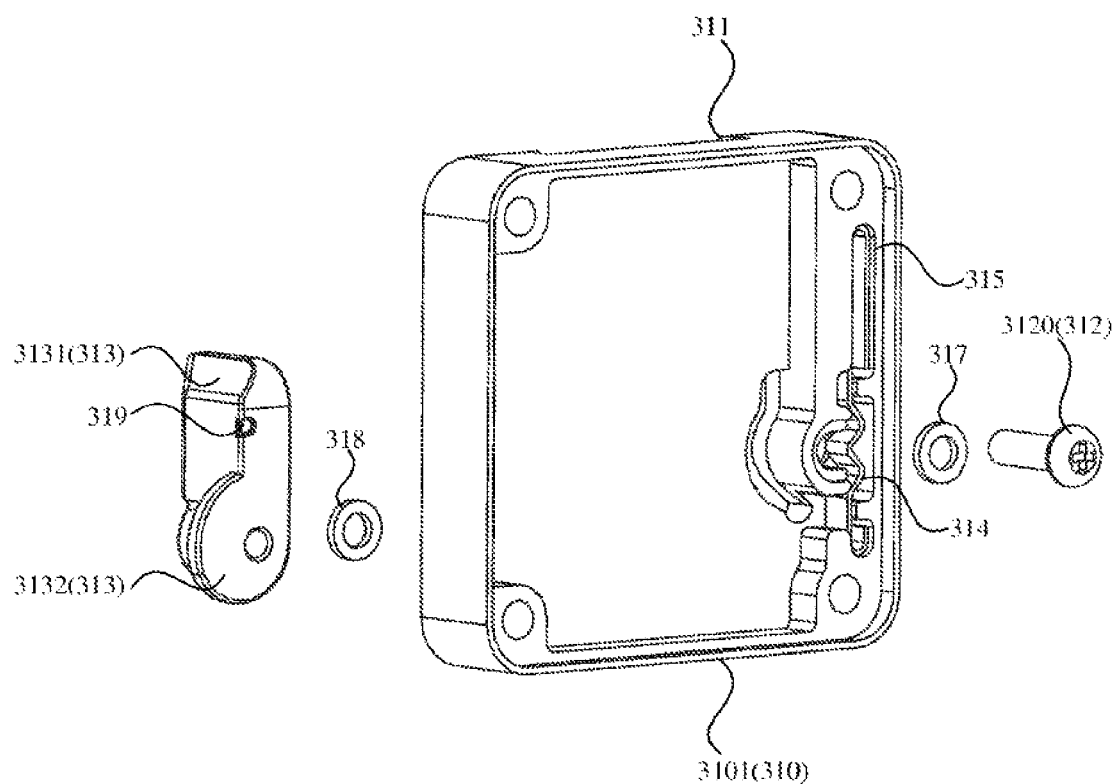
FIG. 15 is a schematic diagram of an exploded structure of some parts of the clamping assembly according to some other embodiments of the present disclosure, where an elastic piece has been installed in a positioning groove of the supporting member.
Figure 16:
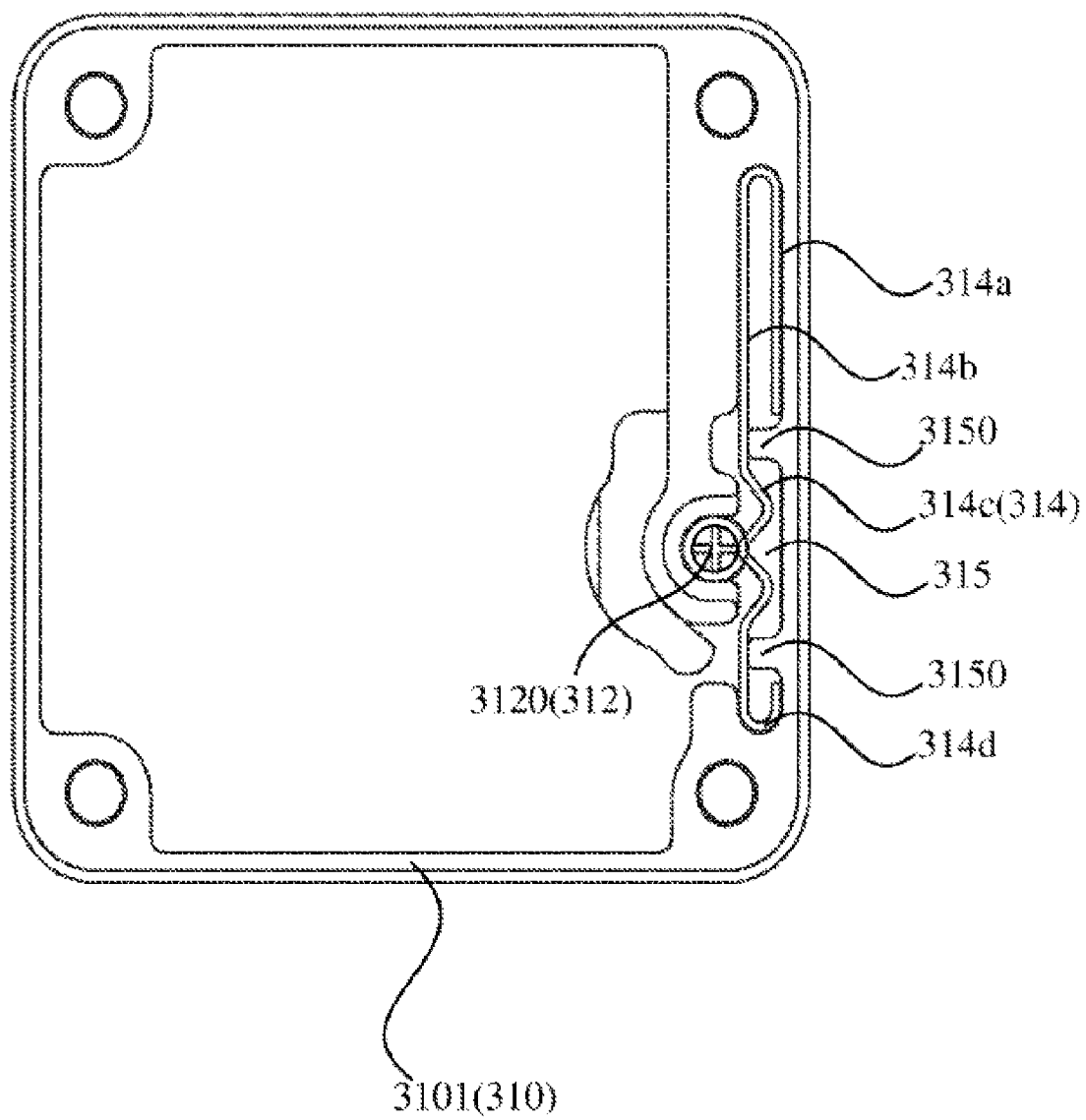
FIG. 16 is a front view of the elastic piece installed in the positioning groove according to some other embodiments of the present disclosure.
Figure 17:
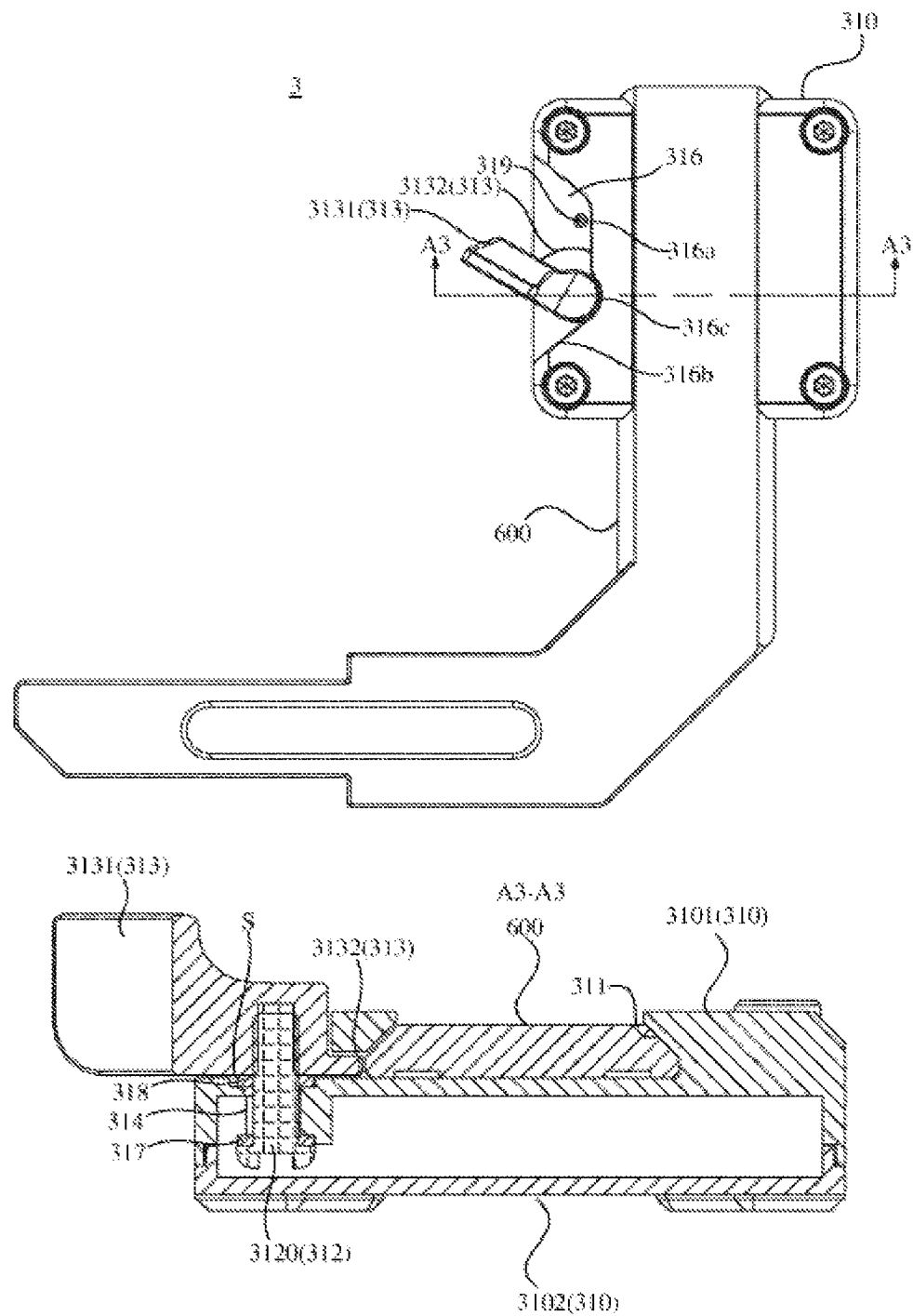
FIG. 17 is a rear view of the clamping assembly and a cross-sectional view along a direction of A3-A3 according to some other embodiments of the present disclosure, where a cam knob is in an unlocked state.
Figure 18:
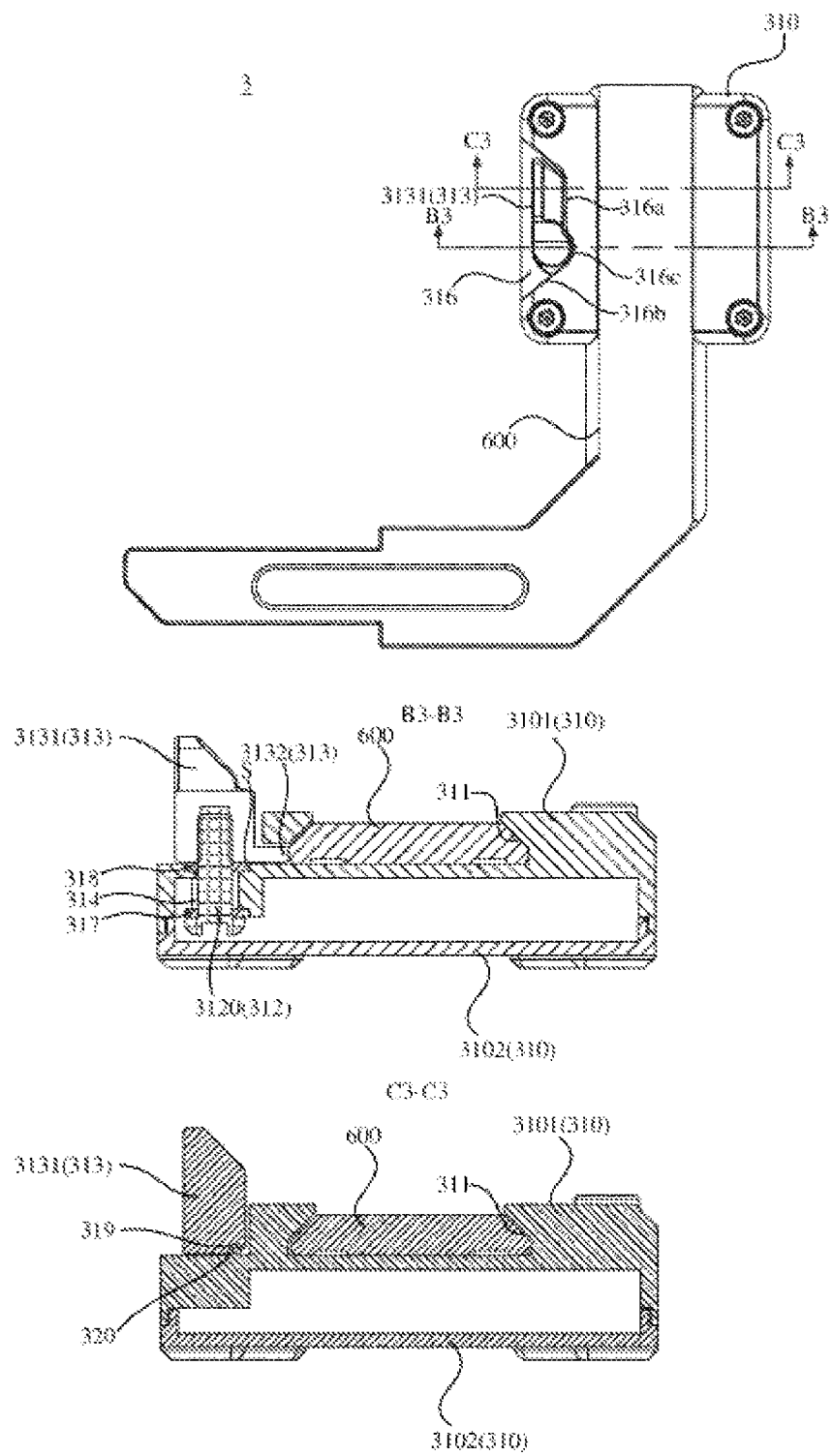
FIG. 18 is a rear view of a clamping assembly and cross-sectional views thereof along directions of B3-B3 and C3-C3 according to still other embodiments of the present disclosure, where the cam knob is in a locked state.

The clamping assembly and the clamping device provided by some embodiments of the present disclosure can effectively alleviate the above technical problems. As shown in FIGS. 13 to 18, FIG. 13 is a schematic diagram of a three-dimensional structure of a clamping assembly according to some embodiments of the present disclosure, FIG. 14 is a schematic diagram of an exploded structure of a clamping assembly according to some other embodiments of the present disclosure, FIG. 15 is a schematic diagram of an exploded structure of some parts of the clamping assembly according to some other embodiments of the present disclosure, (an elastic piece has been installed in a positioning groove of the supporting member), FIG. 16 is a front view of the elastic piece installed in the positioning groove according to some other embodiments of the present disclosure, FIG. 17 is a rear view of the clamping assembly and a cross-sectional view along a direction of A3-A3 according to some other embodiments of the present disclosure, (a cam knob is in an unlocked state), and FIG. 18 is a rear view of a clamping assembly and cross-sectional views thereof along directions of B3-B3 and C3-C3 according to still other embodiments of the present disclosure (the cam knob is in a locked state).

The clamping assembly 3 provided by some embodiments of the present disclosure, as a part of the clamping device, includes a supporting member 310 with a sliding groove 311, a clamping member for clamping mobile device (detachably connected to the supporting member 310 (not shown), the structure may be designed with reference to the above-mentioned embodiments), as well as a cantilever 600, a pin shaft 312, a cam knob 313 and an elastic element 314. The cantilever 600 is slidably assembled with the sliding groove 311, the pin shaft 312 extends from the inside of the supporting member 310 to the outside of the supporting member 310, and has a radial movable gap S with the supporting member 310. The cam knob 313 is arranged outside the supporting member 310 and is fixedly connected to the pin shaft 312, and the elastic element 314 is disposed in the supporting member 310 and located between the pin shaft 312 and the supporting member 310.

In the embodiment of the present disclosure, the locking and unlocking of the sliding of the supporting member 310 relative to the cantilever 600 is realized through cooperation of the cam knob 313, the pin shaft 312 and the elastic element 314. As shown in FIGS. 17 and 18, when the cam knob 313 is rotated along a predetermined direction (for example, the cam knob 313 moves clockwise from the position shown in FIG. 17 to the position shown in FIG. 18), the pin shaft 312 moves toward the elastic element 314 (for example moving to the left shown in FIGS. 17 to 18) and compress the elastic element 314, the cam profile of the cam knob 313 may abut against a part of the cantilever 600 that is located in the sliding groove 311 to lock the sliding of the supporting member 310 relative to the cantilever 600. When the cam knob 313 is rotated along the opposite direction to the preset direction (for example, the cam knob 313 reaches counterclockwise the position shown in FIG. 17 from the position shown in FIG. 18), the pin shaft 312 moves away from the elastic element 314 (for example, moving to the right as shown in FIGS. 18 to 17), the elastic element 314 releases energy, and the cam profile of the cam knob 313 may be separated from the part of the cantilever 600 located in the sliding groove 311 to unlock the sliding of the supporting member 310 relative to the cantilever 600. The clamping assembly 3 of the embodiment of the present disclosure has the characteristics of simple and reliable specific structure, and high convenience for adjusting operation.

As shown in FIG. 14, in order to facilitate the manufacture and assembly of the supporting member 310, the supporting member 310 includes a casing 3101 and a cover body 3102 fixedly connected by a fastener (such as a screw 3103), and the sliding groove 311, the pin shaft 312 (such as a screw 3120), the cam knob 313 and the elastic element 314 are arranged on the casing 3101. The cam knob 313 and the sliding groove 311 are arranged on the side of the casing 3101 facing away from the cover body 3102. The specific shape of the sliding groove 311 is not limited. As shown in FIGS. 17 and 18, the sliding groove 311 is a dovetail groove, and at least a part of the cantilever 600 is adapted to the shape of the sliding groove 311 and may slide into the sliding groove 311. The cantilever 600 may be made of aluminum alloy material with good strength, which is not easy to deform after being stressed. The structural design of the dovetail groove is simple, the processing is convenient, and the requirements for processing accuracy are relatively low.

As shown in FIGS. 17 and 18, in an embodiment of the present disclosure, the pin shaft 312 is specifically a screw 3120, and the clamping assembly 3 further includes a first spacer 317 disposed in the supporting member 310 and a second spacer 318 disposed outside the supporting member 310. The first spacer 317 is sleeved on the screw 3120 and is located between the screw cap of the screw 3120 and the supporting member 310, and the second spacer 318 is sleeved on the screw 3120 and is located between the supporting member 310 and the cam knob 313. The first spacer 317 and the second spacer 318 are, for example, copper sheets, which may be selected according to requirements, for example, only the first spacer 317 or the second spacer 318 may also be provided. The first spacer 317 and the second spacer 318 can improve the sliding friction between the two structures, reduce friction loss, and can also make the operation of the rotating cam knob 313 have a certain sense of damping, making the rotation of the cam knob 313 more stable and reliable. In other embodiments of the present disclosure, the pin shaft 312 may also be a rivet or the like. The present disclosure does not specifically limit the specific form of the pin shaft 312.

In some embodiments, as shown in FIGS. 17 and 18, the cam knob 313 includes a cam part 3132 and a handle 3131 fixedly connected to the cam part 3132; the surface of the supporting member 310 has a groove 316, and the groove 316 includes a first sidewall 316a for stopping the rotation of the handle 3131 along the predetermined direction at the locking position, and a second sidewall 316b for stopping the rotation of the handle 3131 along the opposite direction of the preset direction at the set position. In addition, the groove 316 may further include an arc-shaped sidewall 316c connecting the first sidewall 316a and the second sidewall 316b and matching the shape of the rotation root of the handle 3131. The groove 316 may be provided on the surface of the casing 3101 away from the cover body 3102.

When the handle 3131 is rotated along a predetermined direction (for example, clockwise) until the handle 3131 stops on the first sidewall 316a, the user may feel that the cam knob 313 is in the locking position. When the handle 3131 is rotated in an opposite direction (for example, counterclockwise), the handle 3131 may stop at the second sidewall 316b, that is, the maximum rotation stroke of the handle 3131 is determined by the first sidewall 316a and the second sidewall 316b. The design of the handle 3131 makes the rotation operation of the cam knob 313 relatively labor-saving. The cam knob 313 may be made of aluminum alloy material with better strength, which is not easy to deform after being stressed. The first sidewall 316a, the second sidewall 316b and the arc-shaped sidewall 316c are formed in the groove 316 on the surface of the supporting member 310, which not only facilitates the structural design, but also reduces the design thickness of the supporting member 310.

In some other embodiments of the present disclosure, the handle 3131 may also be directly or indirectly stopped by other structures, so that the handle 3131 does not need to rotate to the first sidewall 316a and/or the second sidewall 316b.

As shown in FIGS. 15, 17 and 18, in some embodiments of the present disclosure, one of the cam knob 313 and the supporting member 310 (for example, the cam knob 313) has a recess 319, the other of the cam knob 313 and the support 310 (for example, the support 310) has a convex hull 320. When the handle 3131 is rotated to stop at the first sidewall 316a, the sliding of the supporting member 310 relative to the cantilever 600 is locked, and at the same time, the convex hull 320 clamps with the recess 319. In this way, a self-locking structure may be further formed when the sliding of the supporting member 310 relative to the cantilever 600 is locked, thereby preventing the cam knob 313 from being accidentally loosened, which further ensures the reliability and stability of the clamping assembly 3 in use. The moment when the convex hull 320 is engaged with the recess 319 may also form force feedback to the hand of the user, so that the user can accurately perceive that the cam knob 313 is rotated in place. Conversely, when the handle 3131 is rotated in the opposite direction, the convex hull 320 breaking away from the recess 319 can also form a force feedback to the hand of the user, so that the user can accurately perceive that the cam knob 313 has unlocked the sliding of the supporting member 310 relative to the cantilever 600.

In other embodiments of the present disclosure, the engagement structure of the above-mentioned convex hull 320 and the recess 319 may not be designed as required, but the self-locking of the structure is realized through the rebound force of the elastic element 314 and the damping force of the first spacer 317 and the second spacer 31.

As shown in FIGS. 14 to 16, in some embodiments of the present disclosure, the supporting member 310 has a positioning groove 315, and the pin shaft 312 passes through the bottom wall of the positioning groove 315, so that the protruding supporting member 310 may assemble with the cam knob 313. The elastic element 314 is an elastic piece disposed in the positioning groove 315. In an embodiment, the material of the elastic piece is spring steel with a thickness of 0.3 mm, which can be elastically deformed after being stressed and maintain good resilience. The specific structural form of the elastic piece is not limited, as long as it may provide the elastic force of the desired direction and size at the desired position.

As shown in FIG. 14, in this embodiment, the positioning groove 315 includes a first groove body portion 315a and a second groove body portion 315b. The first groove body portion 315a is configured to accommodate the pin shaft 312 and position the pin shaft 312. The second groove body portion 315b is configured to accommodate and position the elastic piece. The positioning groove 315 may be designed in combination with the specific structures of the pin shaft 312 and the elastic element, so as to realize the assembly of the pin shaft 312 and the elastic element with the supporting member 310.

In an embodiment, as shown in FIG. 16, the elastic piece is used as the elastic element 314 which includes a first flat plate portion 314a and a second flat plate portion 314b that are integrally connected in a bending form and extend in the same direction, a wave-like curved portion 314c connecting the second flat plate portion 314b, and a snap portion 314d connecting the wave-like curved portion 314c, where the wave-shaped curved portion 314c is adjacent to the pin shaft 312. The above-mentioned second groove body portion 315b includes at least one protruding part 3150 configured to position the elastic piece, for example, two protruding parts 3150 shown in the figure. The elastic deformation of the elastic piece mainly occurs at the wave-like curved portion 314c, and the wave-like curved shape of this portion makes the elastic piece have good resilience and is less prone to destructive deformation. In addition, the overall occupied space of the elastic piece designed in this shape is also small.

In the embodiment of the present disclosure, the clamping assembly 3 further includes a clamping member (not shown in the figure) detachably magnetically connected to the supporting member 310, and the clamping member is configured to clamp the mobile device. As shown in FIG. 14, one of the supporting member 310 and the clamping member (for example, the supporting member 310) has at least two rotational clamping structures 3100 arranged in different directions. The other of the supporting member 310 and the clamping member (for example, the clamping member) has a rotation positioning part, and the rotation positioning part may cooperate with any one of the rotational clamping structures 3100.

The structure of the clamping member configured to clamp the mobile device, for example, is a spring clamping claw, where one clamping end or two clamping ends may be elastically stretched. The specific structure of the rotation clamping position 3100 is not limited, for example, it may be a snap-fit groove, a clamping protrusion, a clamping hole, etc., as long as it can cooperate with the rotation positioning part to restrict the rotation angle of the clamping member relative to the supporting member 310.

As shown in FIG. 14, in some embodiments, there are two rotation locking positions 3100 arranged orthogonally, and the two rotation locking positions 3100 are respectively snap-fit grooves which are communicated approximately in a cross shape. The rotation positioning part (not shown in the figure) has a shape of a protrusion which matches with the shapes of the two snap-fit grooves. The user may choose to fix the mobile device on the clamping assembly 3 horizontally or vertically based on shooting requirements. In these embodiments, multiple options are provided for the clamping direction of the mobile device, and the user may flexibly adjust the clamping direction of the mobile device based on shooting requirements.

In other embodiments of the present disclosure, the clamping assembly 3 may not adopt the above-mentioned detachable magnetic design, but the mobile device is clamped by the supporting member itself, for example, the supporting member is provided with a structure of a spring clamping jaw having an adjustable or non-adjustable clamping direction.

In an embodiment of the present disclosure, the assembly process of the clamping assembly 3 is as follows: first, inserting the elastic piece (i.e., the elastic element 314) into the positioning groove 315 of the casing 3101, where the main deformation region of the elastic piece (i.e., the wave-like curved portion 314c of the elastic piece) is located on one side of the screw hole on the bottom wall of the positioning groove 315; then, placing the second spacer 318 and the cam knob 313 in the groove 316 on the surface of the casing 3101; then, assembling the first spacer 317 and the screw 3120 (that is, the above-mentioned pin shaft 312) with the casing 3101, so that the screw 3120 passes through the positioning groove 315 and is screwed on the cam knob 313; then, fixing the cover 3102 to the casing 3101 by four screws 3103, up to now, the assembly of the supporting member 310 is completed; then, rotating the cam knob 313 away from the locking position, and after the supporting member 310 is mounted on the cantilever 600 at a suitable position, rotating the cam knob 313 to the locking position, up to now, the assembly of the clamping assembly 3 is completed.

The function of the screw 3120 is to serve as the pin shaft 312, and the cam knob 313 rotates around the axis of the screw 3120 as the central axis. As shown in FIG. 17, when the handle 3131 of the cam knob 313 is rotated away from the locking position, the cam part 3132 of the cam knob 313 is in an unscrewed state separated from the cantilever 600, and the elastic piece is in an uncompressed natural state. The screw 3120, the first spacer 317 and the second spacer 318 are in the right position relative to the supporting member 310, and the cam profile of the cam part 3132 has a gap with the part of the cantilever 600 that is located in the sliding groove 311. Therefore, the cantilever 600 may be slide freely in the sliding groove 311.

When the handle 3131 of the cam knob 313 is gradually rotated to the locking position (that is, when it is rotated toward the direction close to the first sidewall 316a), the cam profile of the cam part 3132 and the part of the cantilever 600 that is located in the sliding groove 311 gradually approach and finally contact with each other. As shown in FIG. 18, the screw 3120, the first spacer 317 and the second spacer 318 are pushed by the cantilever 600 to gradually move to the left relative to the supporting member 310, and the screw 3120 compresses the elastic piece to produce elastic deformation. Under the action of the elastic force of the elastic piece, the cam profile of the cam part 3132 abuts against the cantilever 600, and the generated large frictional force restricts the sliding of the cantilever 600 in the sliding groove 311, thereby locking the sliding of the supporting member 310 relative to the cantilever 600. At the same time, the recess 319 of the cam knob 313 snaps onto the convex hull 320 of the supporting member 310 to form a self-lock.

The action principle of the clamping assembly 3 when the cam knob 313 is unlocked is just opposite to the above process, which will not be repeated herein. When it is necessary to adjust the position of the supporting member 310 on the cantilever 600, the handle 3131 of the cam knob 313 is turned to a position away from the locking position, the supporting member 310 is adjusted to a suitable position, and then the handle 3131 of the cam knob 313 is turned to the locking position.

According to an embodiment of the present disclosure, a clamping device is further provided, including the clamping assembly 3 of any one of the above-mentioned embodiments. The specific type of the clamping device is not limited, for example, it may be a gimbal, a stabilizer, a selfie stick, a desktop support for mobile device, or a bedside support for mobile device. The clamping device can achieve stable clamping of the mobile device, and the adjusting operation is also relatively convenient.

As a support platform for mobile device including cameras such as mobile phones, a gimbal may fix and support the mobile device, control the movement and shooting of the mobile device, thereby providing a stable shooting state for the mobile device. The gimbal is usually applicable to multiple pieces of mobile device of different brands and models. In the related art, due to the different number and arrangement of cameras included in different mobile device (such as mobile device of different models, sizes or structures), after being fixed and supported by the gimbal, the offset of the lens optical center of the viewfinder cameras of different mobile device (when an electronic device includes multiple cameras, the viewfinder camera is the main camera) relative to the rotation axis of the gimbal is also different, which leads to a large difference in the viewfinder range of different mobile device when shooting with the help of the gimbal. In particular, when the lens optical center of the viewfinder camera has a large offset relative to the rotation axis of the gimbal, the viewfinder range will be obviously limited, and there will be more shooting blind regions, so it is difficult to obtain ideal shooting effects. In addition, due to the existence of shooting blind regions, the panoramic photos taken by the mobile device with the help of the gimbal will lack image information at the edges. For example, the upper and lower edges of the panoramic photos have black edges, and the shooting effect is very unsatisfactory.

Based on this, according to an embodiment of the present disclosure, a gimbal and a stabilizer including the gimbal are provided, which can realize alignment between the lens optical center of the viewfinder camera of mobile device of different models, sizes or structures, and the horizontal rotation axis and vertical rotation axis of the gimbal at the same time, thereby increasing the viewfinder range of the mobile device for shooting with the help of the gimbal, and improving the shooting effect.

Based on different specific functions and applications of the gimbal, in the embodiments of the present disclosure, the product type of the gimbal is not specifically limited. For example, the gimbal may be a common shooting gimbal, an augmented reality (AR) gimbal, a virtual reality (VR) gimbal, a monitoring gimbal, and the like.

The specific product type of the mobile device to which the gimbal and the stabilizer provided in the embodiments of the present disclosure may be applied is not limited, for example, it may be a mobile phone, a tablet computer, a camera, a video camera, and other types of portable shooting devices. The number, specific type, setting position and arrangement method of the cameras included in the mobile device are also not limited. For example, the mobile device may be a four-camera mobile phone. Four cameras are lined up on the back of the mobile phone. The lenses of the four cameras are respectively an ultra-wide-angle lens, a zoom lens, a viewfinder lens, and a depth-of-field assist lens.

Figure 19:
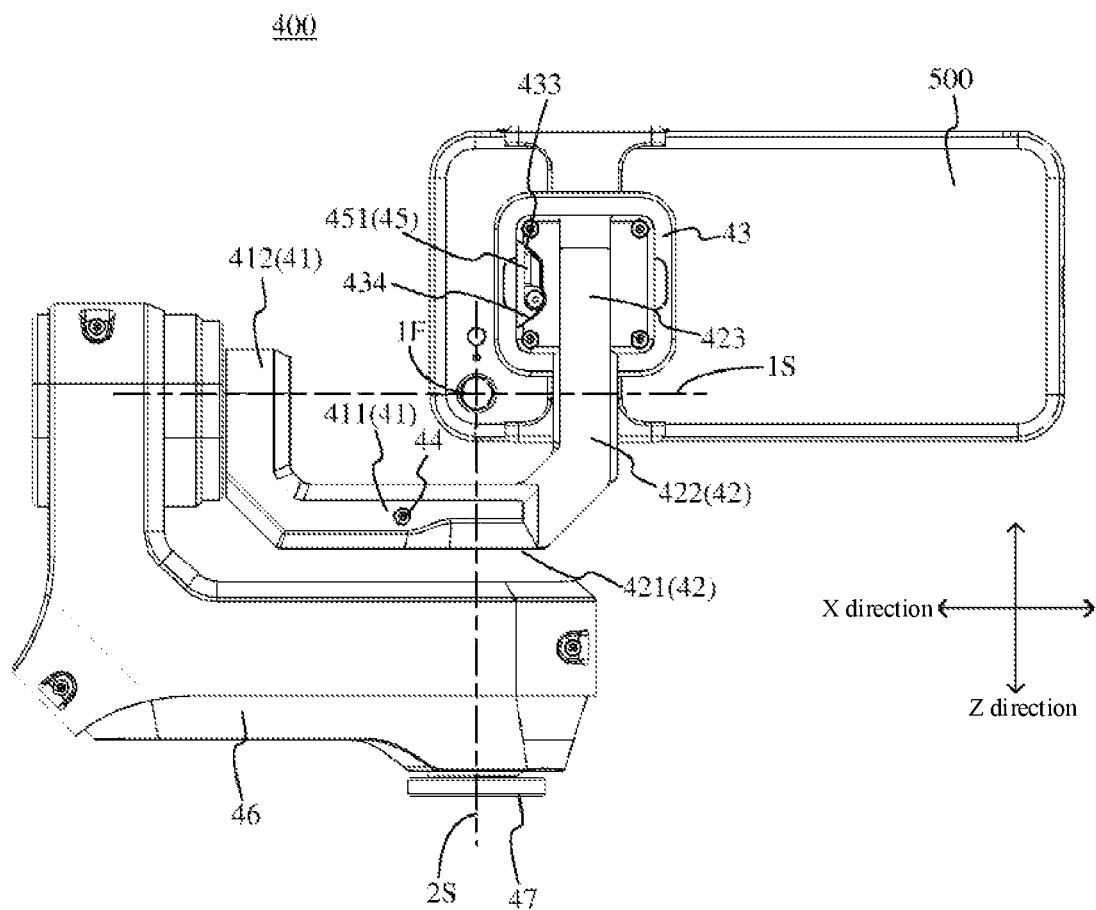
FIG. 19 is a front view of a gimbal according to some embodiments of the present disclosure.
Figure 20:
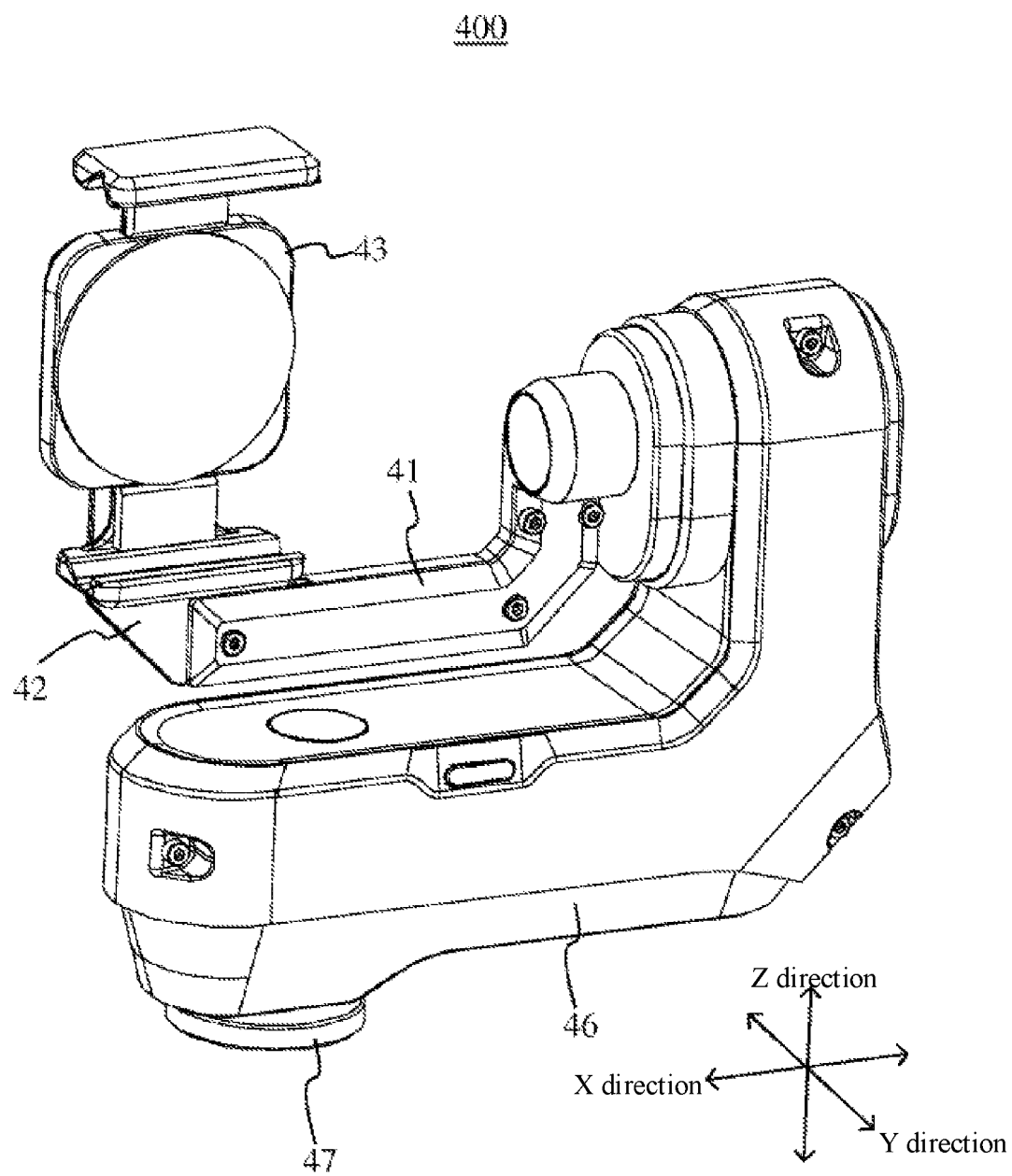
FIG. 20 is a schematic diagram of a three-dimensional structure of a gimbal according to some embodiments of the present disclosure.
Figure 21:
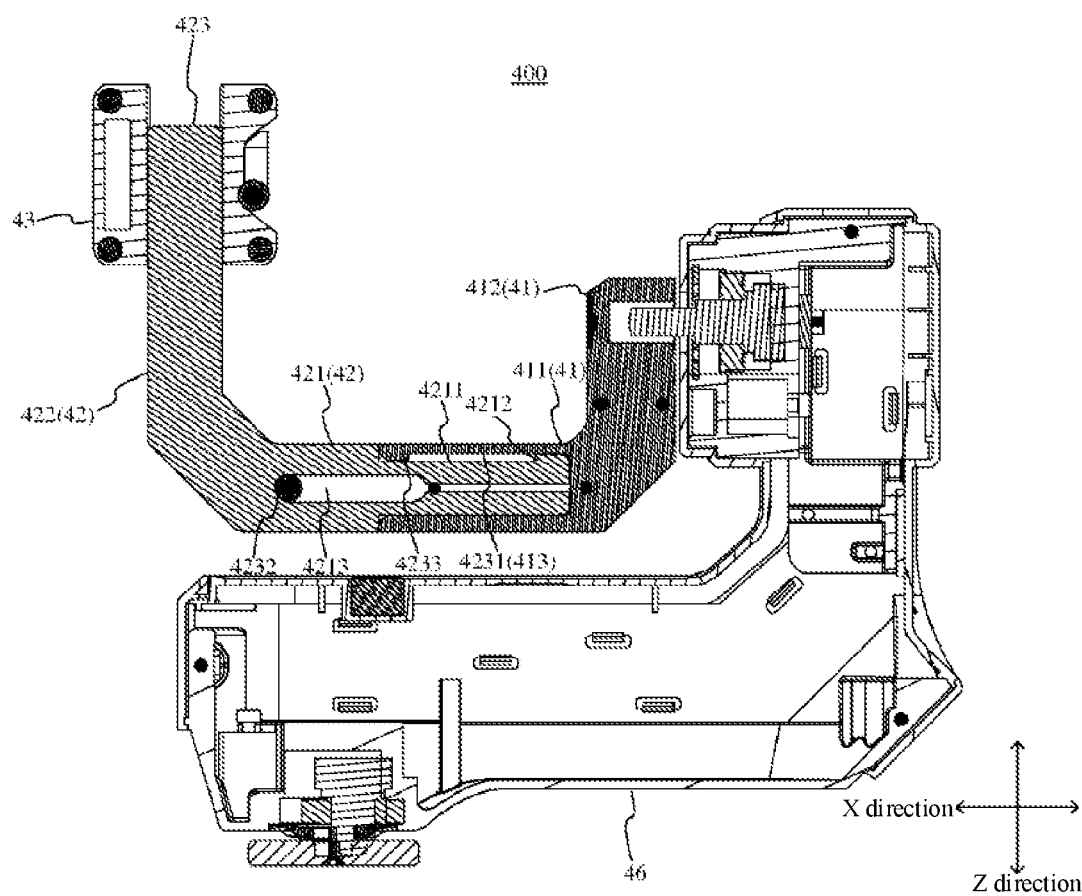
FIG. 21 is a cross-sectional schematic diagram of the first guiding structure of the gimbal cut along XZ Plane according to some embodiments of the present disclosure.

As shown in FIGS. 19, 20 and 21, the gimbal 400 of some embodiments of the present disclosure includes a first cantilever 41, a second cantilever 42, a clamping assembly 43, a first locking mechanism 44, a second locking mechanism 45 and a machine body assembly 46. The first cantilever 41 includes a first guiding structure 413 that provides guidance in a first guiding direction (X direction shown in the figure). The second cantilever 42 is slidably assembled with the first guiding structure 413, and includes a second guiding structure 423 providing guidance in a second guiding direction (Z direction shown in the figure), where the second guiding direction is orthogonal to the first guiding direction. The clamping assembly 43 is slidably assembled with the second guiding structure 423 and is configured to clamp and fix the mobile device 500. The clamping assembly may adopt the design scheme of any one of the above-mentioned embodiments. The first locking mechanism 44 is configured to lock the sliding of the second cantilever 42 relative to the first guiding structure 413. The second locking mechanism 45 is configured to lock the sliding of the clamping assembly 43 relative to the second guiding structure 423. The inside of the machine body assembly 46 is provided with a first driving mechanism and a second driving mechanism (not shown in the figure), the first driving mechanism is configured to drive the first cantilever 41 to rotate around the first axis 1S, and the second driving mechanism is configured to drive the machine body assembly 46 to rotate around the second axis 2S, where the first axis 1S is arranged along the first guiding direction, and the second axis 2S is arranged along the second guiding direction.

The gimbal and the stabilizer are precision clamping devices with special functions, which may include the clamping assembly of any one of the above-mentioned embodiments.

In some embodiments of the present disclosure, the coordinate system of the gimbal 400 is set as shown in FIGS. 19 and 20, the horizontal direction (X direction) is defined as the first guiding direction, and the vertical direction (Z direction) is defined as the second guiding direction, the third direction (Y direction) is perpendicular to both the first guiding direction (X direction) and the second guiding direction (Z direction). Thus, the first axis 1S is the horizontal rotation axis of the gimbal 400, and the second axis 2S is the vertical rotation axis of the gimbal 400. In other embodiments of the present disclosure, based on the installation state of the gimbal, it is also possible to use the vertical direction as the first guiding direction, the horizontal direction as the second guiding direction, the first axis as the vertical rotation axis, and the second axis as the horizontal rotation axis, and the present disclosure does not specifically limit the setting of the gimbal coordinate system.

The first driving mechanism drives the first cantilever 41 to rotate around the first axis 1S, so that the rotation of the mobile device 500 around the first axis 1S can be realized, that is, the rotation of the lens optical center 1F of the viewfinder camera around the first axis 1S can be realized. The second driving mechanism drives the machine body assembly 46 to rotate around the second axis 2S, so that the rotation of the mobile device 500 around the second axis 2S can be realized, that is, the rotation of the lens optical center 1F of the viewfinder camera around the second axis 2S can be realized. Through the synergistic effect of the first driving mechanism and the second driving mechanism, the mixed movement of the lens optical center 1F of the viewfinder camera in the horizontal direction and the vertical direction can be realized, and each point on the movement curve may be decomposed into a rotational movement component around the first axis 1S and a rotational movement component around the second axis 2S. The specific structural designs of the first driving mechanism and the second driving mechanism are not limited, for example, they may include motors, worm gears, transmission belts, transmission gears and the like.

With the help of the gimbal 400 of the embodiment of the present disclosure, the lens optical center 1F of the viewfinder camera of the mobile device 500 can be aligned with the horizontal rotation axis and the vertical rotation axis of the gimbal 400 at the same time, and the specific operations are as follows:

Step 1, clamping and fixing the mobile device 500 on the clamping assembly 43;

Step 2, sliding and adjusting the position of the clamping assembly 43 on the second guiding structure 423, making the lens optical center 1F of the viewfinder camera roughly aligned with the first axis 1S (that is, making the lens optical center 1F of the viewfinder camera substantially coincident on the first axis 1S) by the observation with the naked eye, and after the adjustment is completed, locking the sliding of the clamping assembly 43 relative to the second guide structure 423 by the second locking mechanism 45;

Step 3, sliding and adjusting the position of the second cantilever 42 on the first guiding structure 413, making the lens optical center 1F of the viewfinder camera roughly aligned with the second axis 2S (that is, making the lens optical center 1F of the viewfinder camera substantially coincident on the second axis 2S) by the observation with the naked eye, and after the adjustment is completed, locking the sliding of the second cantilever 42 relative to the first guiding structure 413 by the first locking mechanism 44. The operation sequence of this step 3 and the above step 2 may also be interchanged.

After the above steps are completed, the mobile device 500 is stably fixed and supported by the gimbal 400. No matter how the mobile device 500 moves with the gimbal 400, the lens optical center 1F of the viewfinder camera is always roughly aligned with the first axis 1S and the second axis 2S.

Figure 22A:
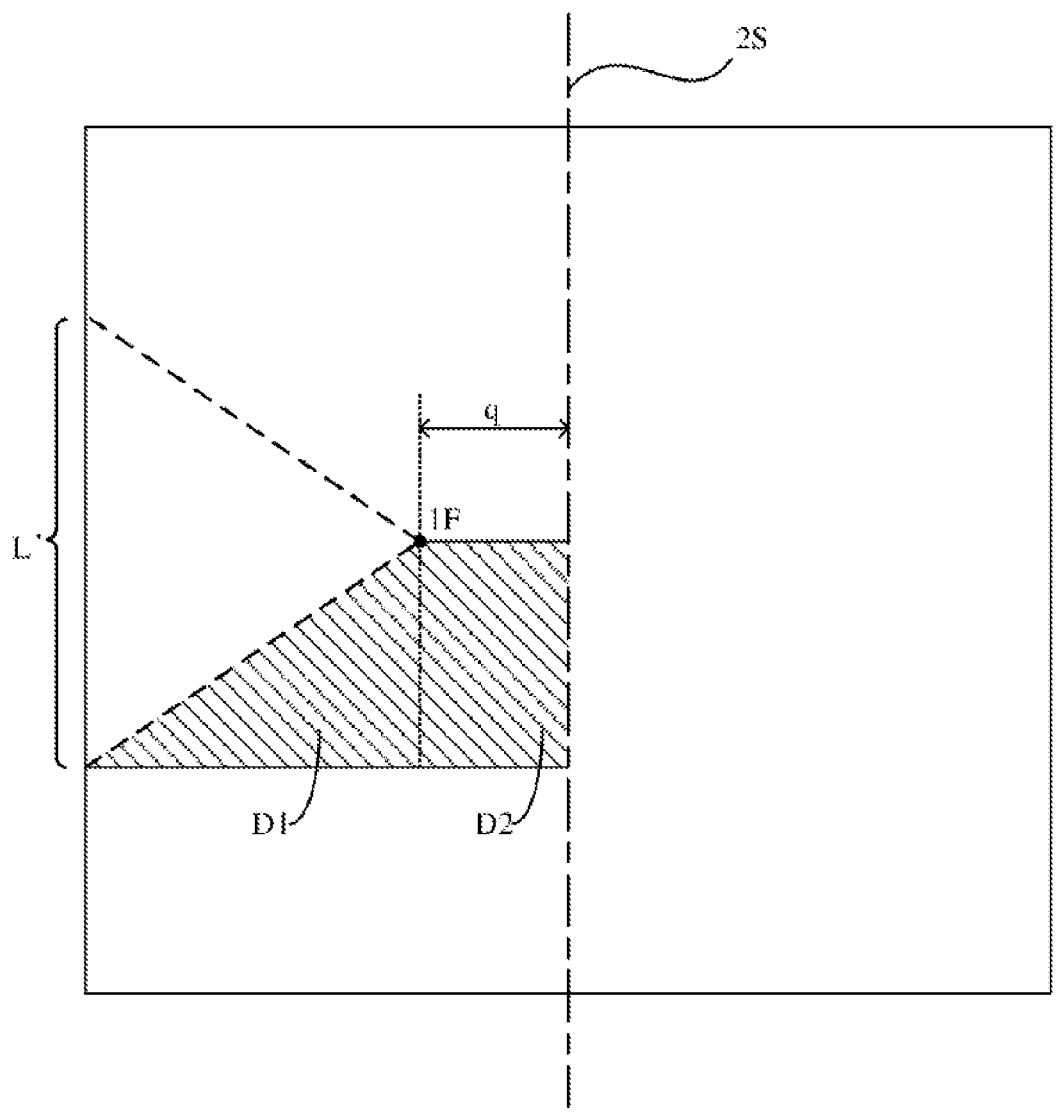
FIG. 22A is a schematic diagram of the shooting blind region and viewfinder width when a horizontal offset distance of a lens optical center of a viewfinder camera relative to the second axis is q.

As shown in FIG. 22A, assuming that the mobile device is installed behind the gimbal, the horizontal offset distance of the lens optical center 1F of the viewfinder camera relative to the second axis 2S is q, then the shooting blind region of the viewfinder camera includes: an inherent shooting blind region D1 of the viewfinder camera, and a shooting blind region D2 caused by the offset distance q. The viewfinder width of the viewfinder camera in space is L'.

Figure 22B:
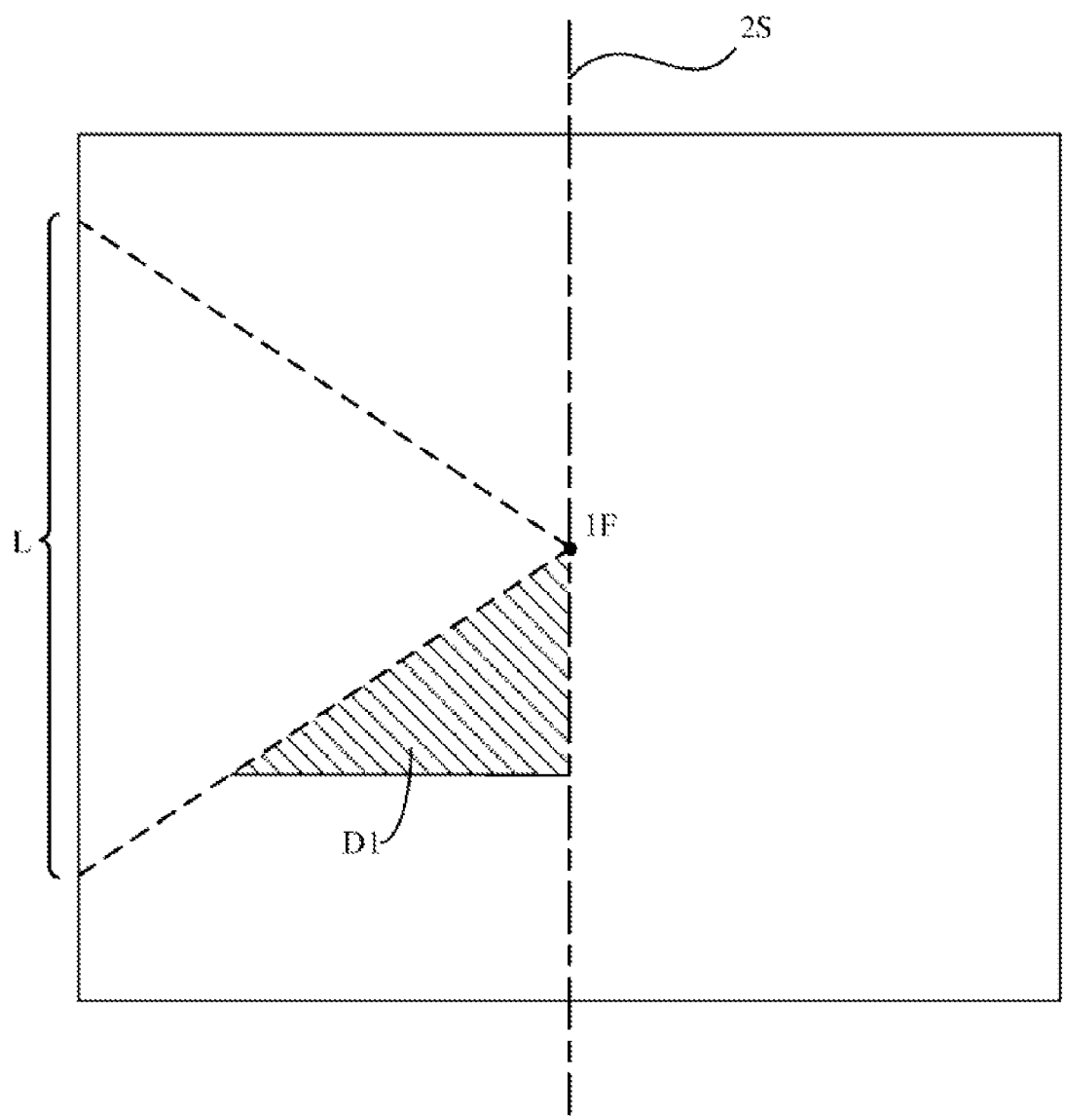
FIG. 22B is a schematic diagram of the shooting blind region and viewfinder width when the lens optical center of the viewfinder camera is aligned with the second axis.

As shown in FIG. 22B, assuming that the mobile device is installed behind the gimbal, the lens optical center 1F of the viewfinder camera is aligned with the second axis 2S, that is, the horizontal offset distance is an ideal value of zero, then the shooting blind region of the viewfinder camera only includes its inherent shooting blind region D1, which is significantly smaller than the shooting blind region D1+D2 in FIG. 22A. Moreover, since the lens optical center 1F of the viewfinder camera is aligned with the second axis 2S, as compared with FIG. 22A and FIG. 22B, it may be seen that the viewfinder width of the viewfinder camera in space is L, which is obviously larger than the viewfinder width L' in FIG. 22A. A larger viewfinder width means a larger viewfinder range.

From the above analysis, it may be seen that since the lens optical center 1F of the viewfinder camera can be roughly aligned with the first axis 1S and the second axis 2S, the design of the gimbal in the embodiment of the present disclosure can overcome related technical defects and reduce the shooting blind region, obtain a larger viewfinder range, and further obtain better shooting results.

For different mobile device 500 (such as mobile device 500 of different brands or models), the lens optical center 1F of the viewfinder camera of the mobile device 500 may be roughly aligned with the first axis 1S and the second axis 2S through the above operations. Therefore, when the gimbal 400 of the embodiment of the present disclosure is used for different mobile device, a larger viewfinder range may be obtained by adjustment, thereby obtaining a better shooting effect. The gimbal 400 has a very wide range of applications.

Some gimbal products, such as AR gimbals or VR gimbals, support that software of mobile device synthesizes multiple photos taken at multiple angles of view into a panoramic photo through a stitching algorithm. In the related art, when the offset of the lens optical center relative to the rotation axis of the gimbal is large, the panorama photos obtained through the stitching algorithm may lack image information at the edge. Based on the design of the gimbal 400 in the embodiment of the present disclosure, since the lens optical center 1F can be roughly aligned with the first axis 1S and the second axis 2S, that is, no matter how the mobile device 500 moves with the gimbal 400, the lens optical center 1F always remains unchanged relative to the gimbal 400, so that the blind region of the photo can be reduced as much as possible, and a relatively ideal panoramic photo can be obtained after splicing.

The first cantilever 41 may be provided with a first standard mark that provides an alignment reference for the alignment of the lens optical center 1F and the first axis 1S, and a second standard mark that provides an alignment reference for the alignment of the lens optical center 1F and the second axis 2S. The second cantilever 42 may be provided with a scale mark along the second guiding structure 423. The first standard mark, the second standard mark and the scale mark may provide an adjustment reference for the user to operate the gimbal 400 and adjust the gimbal 400.

The specific structural forms of the first cantilever 41 and the second cantilever 42 are not limited. As shown in FIGS. 19 and 21, in some embodiments, the first cantilever 41 includes a first arm section 411 extending along a first guiding direction and a second arm section 412 extending along a second guiding direction. The first guiding structure 413 is arranged on the first arm section 411, the first driving mechanism is configured to drive the second arm section 412 to rotate around the first axis 1S. The second cantilever 42 includes a third arm section 421 extending along the first guiding direction and a fourth arm section 422 extending along the second guiding direction. The third arm section 421 is slidably assembled with the first guiding structure 413, and the second guiding structure 423 is arranged on the fourth arm section 422. In this embodiment, the first cantilever 41 and the second cantilever 42 are roughly U-shaped after assembly.

The specific structural form of the first guiding structure 413 is not limited. As shown in FIG. 21, in some embodiments, the first guiding structure 413 includes a guiding groove 4231 provided on the first arm section 411, the guiding groove 4231 has a blocking part 4233, and the third arm section 421 includes a sliding part 4211 that is slidably assembled in the guiding groove 4231. The sliding part 4211 has a stopping part 4212 capable of stopping at the blocking part 4233, and the stopping part 4212 is closer to the second arm section 412 than the blocking part 4233. In addition, in this embodiment, the third arm section 421 has a strip-shaped hole 4213 extending along the first guiding direction, and the first guiding structure 413 includes a guiding post 4232 located in the strip-shaped hole 4213 and capable of sliding relative to the strip-shaped hole 4213. In this embodiment, the guiding groove 4231 and the guiding post 4232 simultaneously provide guidance for the sliding of the second cantilever 42 relative to the first cantilever 41 in the first guiding direction, and the guidance is precise and reliable. In other embodiments of the present disclosure, only the guiding groove 4231 or only the guiding post 4232 may provide guidance for the sliding of the second cantilever 42 relative to the first cantilever 41 in the first guiding direction, and on the premise of meeting the structural design requirements, the present disclosure does not specifically limit this.

In the embodiment shown in the figures of the present disclosure, the first locking mechanism 44 is a fastener. The specific structural form of the first locking mechanism is not limited thereto. For example, the first locking mechanism may also be a locking buckle or a locking wrench.

Figure 23:
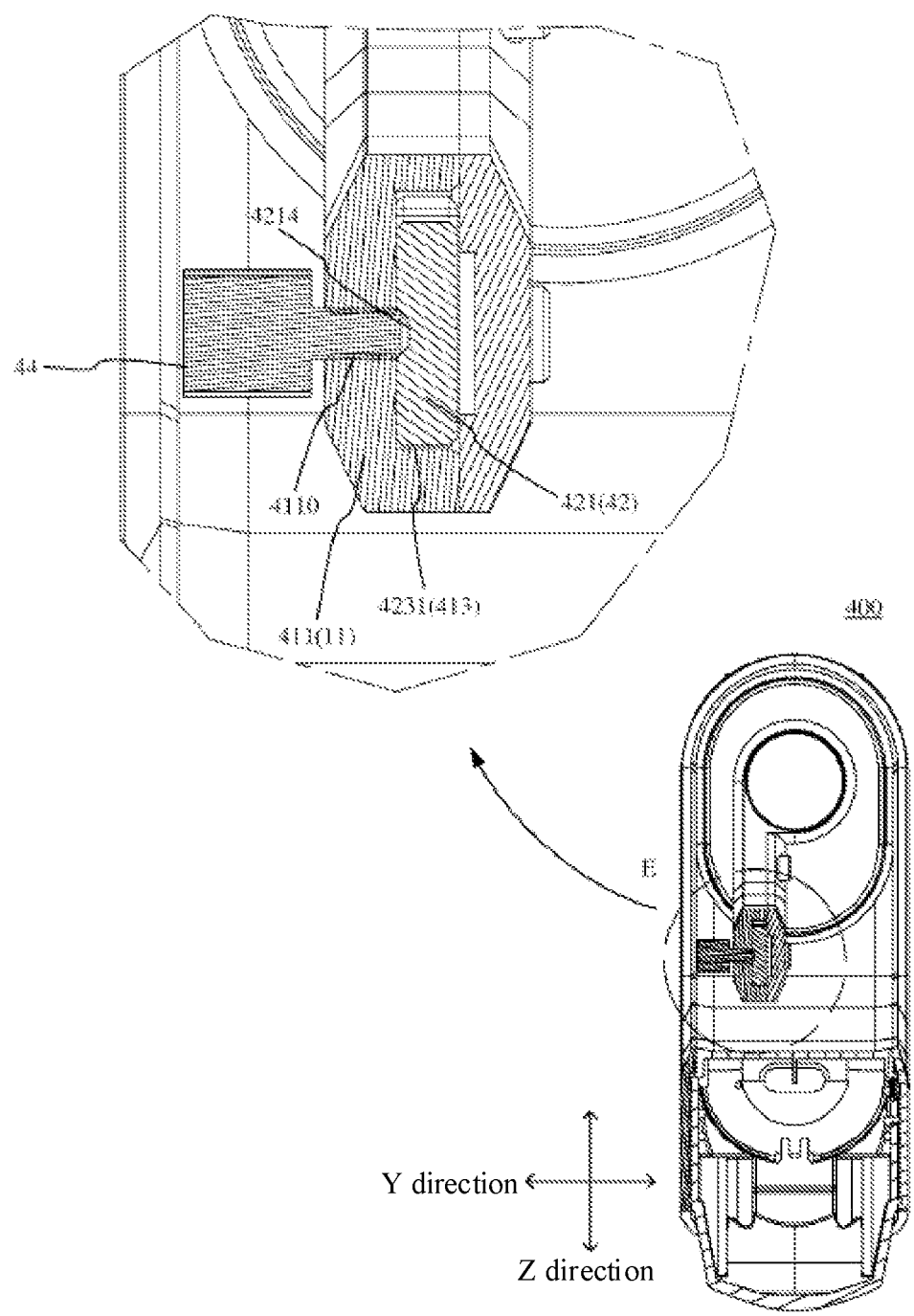
FIG. 23 is a cross-sectional schematic view of the first locking structure of the gimbal cut along YZ Plane according to some embodiments of the present disclosure.

As shown in FIG. 23, in some embodiments, the first arm section 411 is provided with a threaded hole 4110, the first locking mechanism 44 is a fastener threadedly coupled with the threaded hole 4110, the fastener may be screwed to a first locking position (i.e. the position shown in the figure) and a first unlocking position. In the first locking position, the fastener abuts against the third arm section 421, and the third arm section 421 is restricted from sliding relative to the first guide structure 413 by the abutting friction force. In the first unlocking position, the fastener is screwed until it is separated from the third arm section 421, so that the third arm section 421 is allowed to slide relative to the first guiding structure 413. The sliding of the third arm section 421 relative to the first guide structure 413 may be locked and unlocked by forwardly or reversely screwing the fastener. The structure is simple in design and easy to be operated. The fasteners may be, for example, various types of general specification screws or specially designed screws, which are not specifically limited in the present disclosure.

In this embodiment, the side of the third arm section 421 facing the fastener has a groove 4214 extending along the first guiding direction, and the fastener abuts against the groove wall of the groove 4214 when the fastener is in the first locking position. The groove 4214 is, for example, a V-shaped groove or a trapezoidal groove. This design not only can lock the sliding of the third arm section 421 relative to the first guide structure 413, but also prevents the third arm section 421 from moving up and down relative to the first guiding structure 413, thereby improving the mechanism stability of the gimbal 400 to fix the mobile device 500. On the other hand, this design is also beneficial to reduce the manufacturing and assembly accuracy requirements of the first cantilever 41 and the second cantilever 42, thereby reducing the production cost.

The specific structural form of the second locking mechanism 45 is not limited, for example, it may be a fastener, a locking buckle, or a locking wrench.

Figure 24:
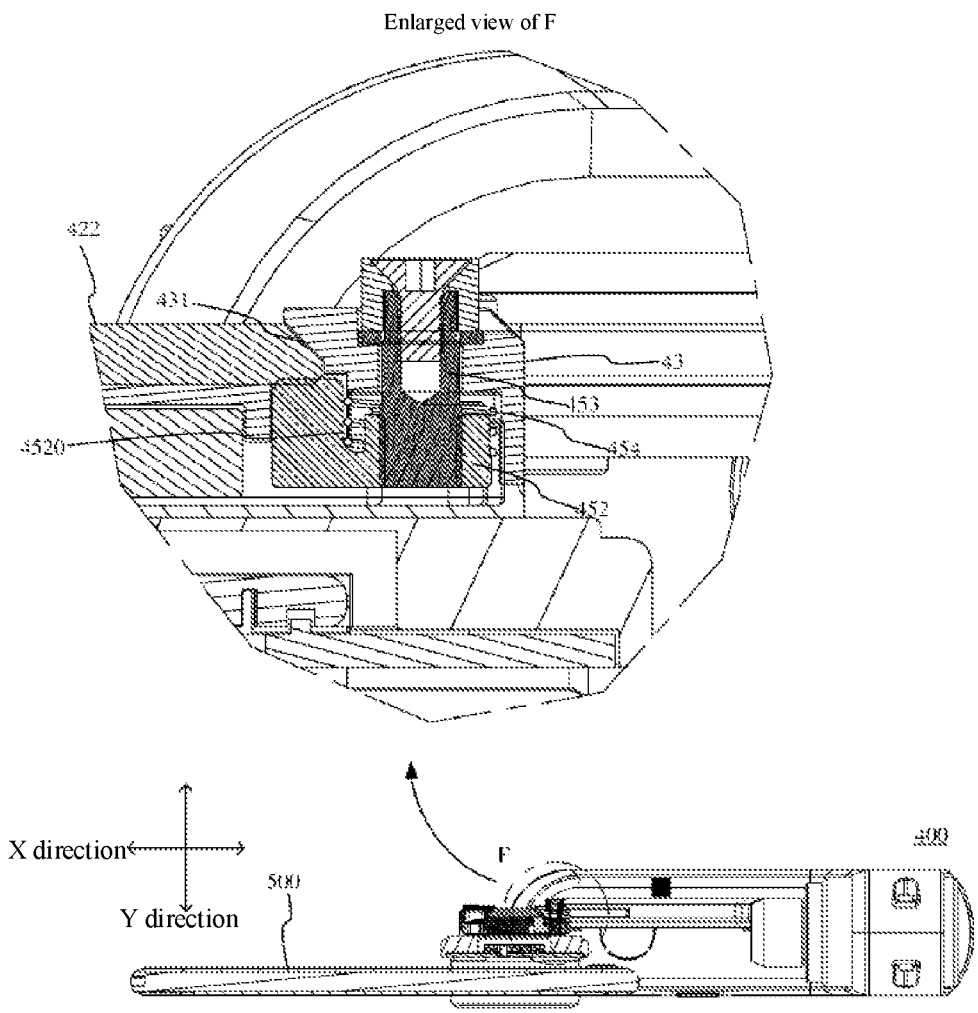
FIG. 24 is a cross-sectional schematic view of the second locking structure of the gimbal cut along XY Plane according to some embodiments of the present disclosure.

As shown in FIGS. 19 and 24, in some embodiments, the second locking mechanism 45 is a wrench assembly provided on the clamping assembly 43. The wrench assembly includes: a wrench 451 and a locking block 452 driven by the wrench 451. The wrench 451 may be rotated to the second locking position and the second unlocking position. When the wrench 451 is in the second locking position, the locking block 452 abuts against the fourth arm section 422 to restrict the sliding of the clamping assembly 43 relative to the fourth arm section 422 (that is, the state shown in FIG. 24). When the wrench 451 is in the second unlocking position, the locking block 452 is separated from the fourth arm section 422 to allow the sliding of the clamping assembly 43 relative to the fourth arm section 422. By turning the wrench 451 forward or reverse, the sliding of the clamping assembly 43 relative to the fourth arm section 422 may be locked and unlocked, and the operation is simple and labor-saving.

In the embodiment of the present disclosure, the side of the clamping assembly 43 configured to clamp the mobile device 500 is defined as the clamping side, and the wrench 451 may be provided on the clamping side or the non-clamping side of the clamping assembly 43, for example, the wrench 451 may be arranged on the back side of the clamping side of the clamping assembly 43, so that the operation of clamping the mobile device 500 and the operation of locking the position of the clamping assembly 43 do not interfere with each other, the freedom of operation is higher, and adjustment also becomes easier.

In some embodiments of the present disclosure, as shown in FIG. 24, the clamping assembly 43 has a sliding groove 431 slidably assembled with the fourth arm section 422, and an accommodating cavity 432 communicated with the sliding groove 431. In some embodiments, the cross section of the fourth arm section 422 perpendicular to the second guiding direction is roughly trapezoidal as shown in the figure, this structure serves as the second guiding structure 423 of the second cantilever 42, and the sliding groove 431 has a dovetail groove having a shape cooperating therewith, of course, the structure of the sliding assembly is not limited thereto. The wrench 451 is disposed outside the clamping assembly 43, and the wrench assembly further includes a threaded shaft 453 and a spring 454. The threaded shaft 453 is coaxially and fixedly connected with the wrench 451 through screws, and the threaded shaft 453 extends into the accommodating cavity 432. The locking block 452 is threadedly coupled with the threaded shaft 453 and is restricted from rotating with the threaded shaft 453 by the cavity wall of the accommodating cavity 432. When the wrench 451 turns from the second unlocking position to the second locking position, the locking block 452 moves linearly toward the fourth arm section 422 and may abut against the fourth arm section 422 (the state shown in FIG. 24 is a state where the locking block abuts against the fourth arm section 422 at the second locking position), when the wrench 451 is turned from the second locking position to the second unlocking position, the locking block 452 linearly moves away from the fourth arm section 422. The spring 454 is also arranged in the accommodating chamber 432, for example, in the accommodating groove 4520 of the locking block 452, and is configured to apply a pre-tightening force to the locking block 452 facing away from the wrench 451 (that is, facing away from the fourth arm section 422). In these embodiments, the side of the locking block 452 facing the wrench 451 has an accommodating groove 4520, and the spring 454 is located in the accommodating groove 4520, so as to facilitate assembly and ensure the telescopic direction.

The pre-tightening force applied by the spring 454 to the locking block 452 facing away from the wrench 451 may prevent the wrench 451 from loosening or moving axially. These embodiments realize the locking and unlocking of the sliding of the clamping assembly 43 by converting the rotational movement of the wrench 451 into the linear movement of the locking block 452. The structural design is ingenious and reliable, and the wrench occupies less space, and the operation is simple, convenient and labor-saving.

As shown in FIG. 19, in some embodiments, the back side of the clamping assembly 43 has a first blocking sidewall 433 and a second blocking sidewall 434 configured to restrict the rotation of the wrench 451 between the second unlocking position and the second locking position. For example, when the wrench 451 rotates clockwise to stop at the first blocking sidewall 433, the user may feel that the wrench 451 is in the second unlocking position; when the wrench 451 rotates counterclockwise to stop at the second blocking sidewall 434, the user may feel that the wrench 451 is in the second unlocking position. The first blocking sidewall 433 and the second blocking sidewall 434 may be the sidewalls of the groove structure on the back side of the clamping assembly 43, which not only facilitates the structural design, but also reduces the designed thickness of the clamping assembly 43.

Figure 25:
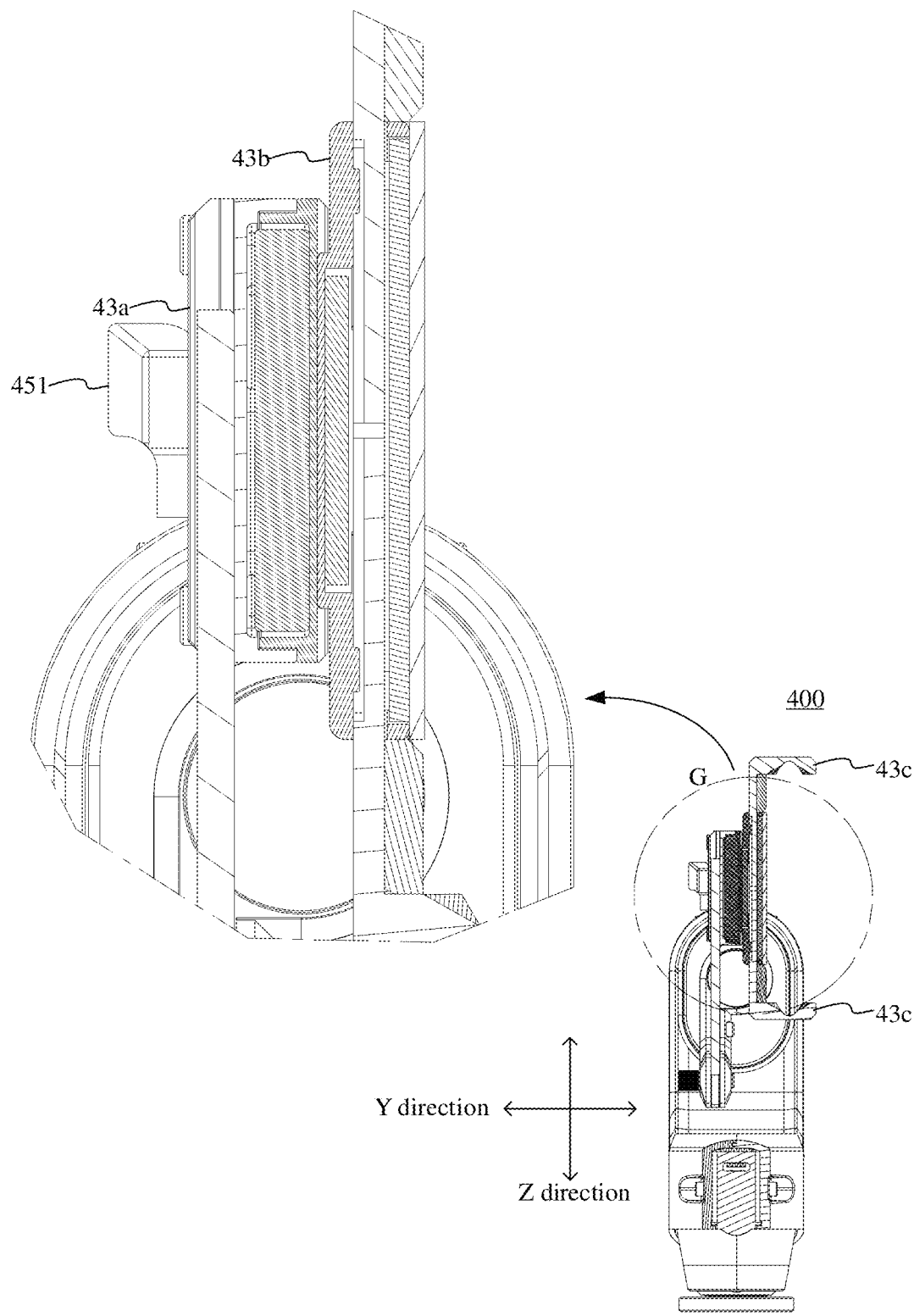
FIG. 25 is a schematic cross-sectional view of the clamping assembly of the gimbal cut along YZ Plane according to some embodiments of the present disclosure.
Figure 26:
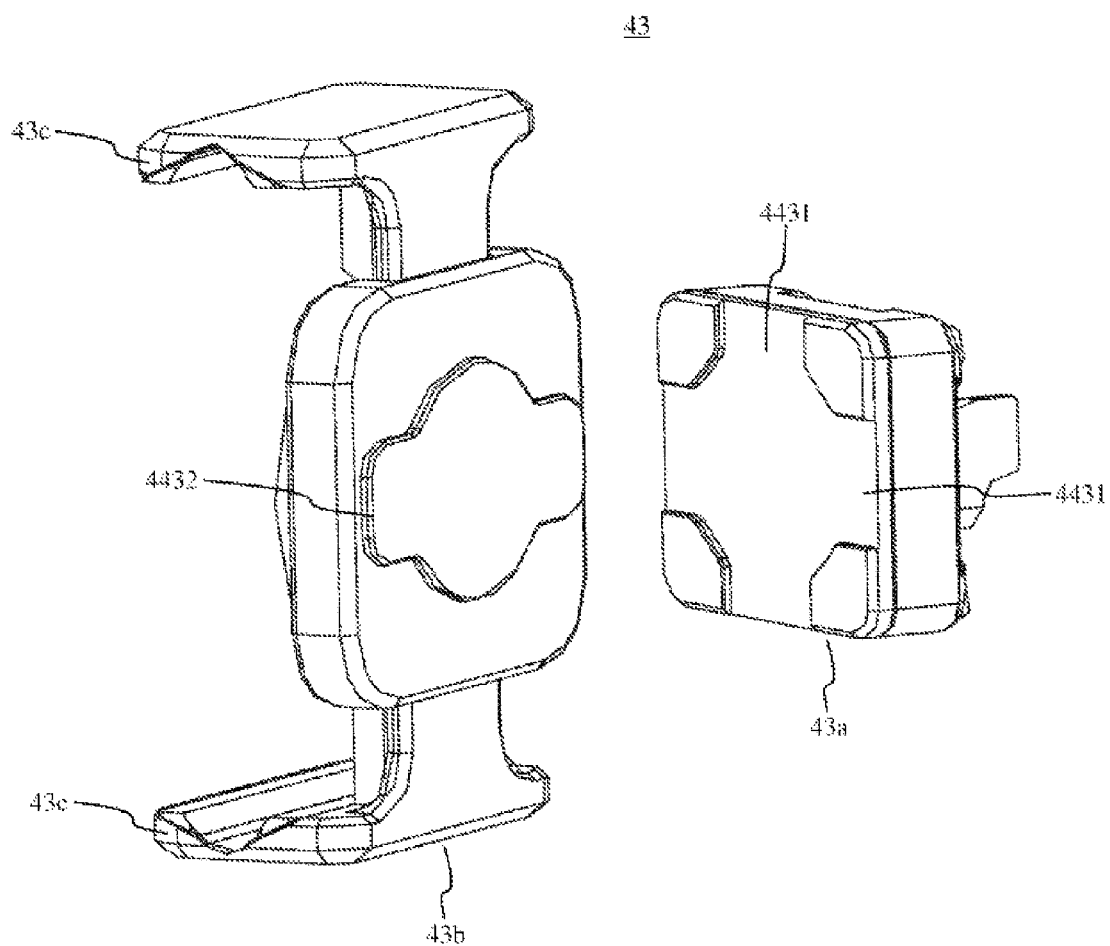
FIG. 26 is an exploded schematic view of a clamping assembly of a gimbal according to some embodiments of the present disclosure.

The specific structural form of the clamping assembly 43 is not limited, as long as the mobile device 500 can be stably clamped. As shown in FIGS. 25 and 26, in some embodiments of the present disclosure, the clamping assembly 43 includes: a supporting member 43a slidably assembled with the second guiding structure 423, a clamping member 43b detachably magnetically connected to the supporting member 43a, two clamping parts 43c arranged oppositely, and an elastic stretching mechanism (not shown in the figure) connecting the two clamping parts 43c, the two clamping parts 43c and the elastic stretching mechanism are arranged on the clamping member 43b.

The two clamping parts 43c may clamp and fix the mobile device 500 through the action of the elastic stretching mechanism. The clamping member 43b of the clamping member 43 in the embodiment of the present disclosure is detachable and magnetically connected to the supporting member 43a. Users may choose to first clamp and fix the mobile device 500 on the clamping member 43b, and then magnetically adsorb the clamping member 43b to the supporting member 43a. This makes the clamping and fixing of the mobile device 500 more convenient to be operated and can also avoid damage to the gimbal 400 due to improper clamping operation. The clamping member 43b, the two clamping parts 43c and the elastic stretching mechanism with multiple specifications may be designed as an optional part of the gimbal 400 product, which may be selected or replaced as required.

In some embodiments of the present disclosure, one of the supporting member 43a and the clamping member 43b has at least two rotational clamping structures arranged in different directions, and the other of the supporting member 43a and the clamping member 43b has a rotation positioning part, and the rotation positioning part may cooperate with any rotation clamping position. For example, as shown in FIG. 26, the surface of the supporting member 43a facing the clamping member 43b has at least two rotational clamping structures 4431 arranged in different directions, the surface of the clamping member 43b facing the supporting member 43a has a rotation positioning part 4432, and the rotation positioning part 4432 may rotate with the clamping member 43b to cooperate with any one of the rotational clamping structures 4431. The specific structure of the rotation clamping position 4431 is not limited, for example, it may be a snap-fit groove, a clamping protrusion, a clamping hole, etc., as long as it can cooperate with the rotation positioning part 4432 to restrict the rotation angle of the clamping member 43b relative to the supporting member 43a.

As shown in FIG. 26, in some embodiments, there are two rotational clamping structures 4431 arranged orthogonally, and the two rotational clamping structures 4431 are respectively snap-fit grooves communicated in a cross. The rotation positioning part 4432 is in a convex shape, and matches with the shapes of the two snap-fit grooves. The user may choose to fix the mobile device 500 on the gimbal 400 horizontally or vertically based on shooting requirements. When the mobile device 500 is selected to being fixed horizontally on the gimbal 400, the rotation positioning part 4432 cooperates with one of the snap-fit grooves, and the clamping direction of the two clamping parts 43c is along the second guiding direction (as shown in FIG. 19). When the mobile device 500 is selected to being fixed vertically on the gimbal 400, the rotation positioning part 4432 cooperates with another snap-fit groove, and the clamping direction of the two clamping parts 43c is along the first guiding direction.

In these embodiments, the design of the clamping assembly 43 provides multiple options for the clamping direction of the mobile device 500, and the user may flexibly adjust the clamping direction of the mobile device 500 based on shooting requirements to obtain desired and ideal shooting effects.

In the above embodiments of the present disclosure, as shown in FIG. 20, the gimbal 400 further includes a mounting chassis 47 disposed at the bottom of the machine body assembly 46, and the gimbal 400 is configured to be mounted on a support carrier such as a tripod through the mounting chassis 47. The second driving mechanism is configured to drive the machine body assembly 46 to rotate relative to the mounting chassis 47 around the second axis S2.

Figure 27:
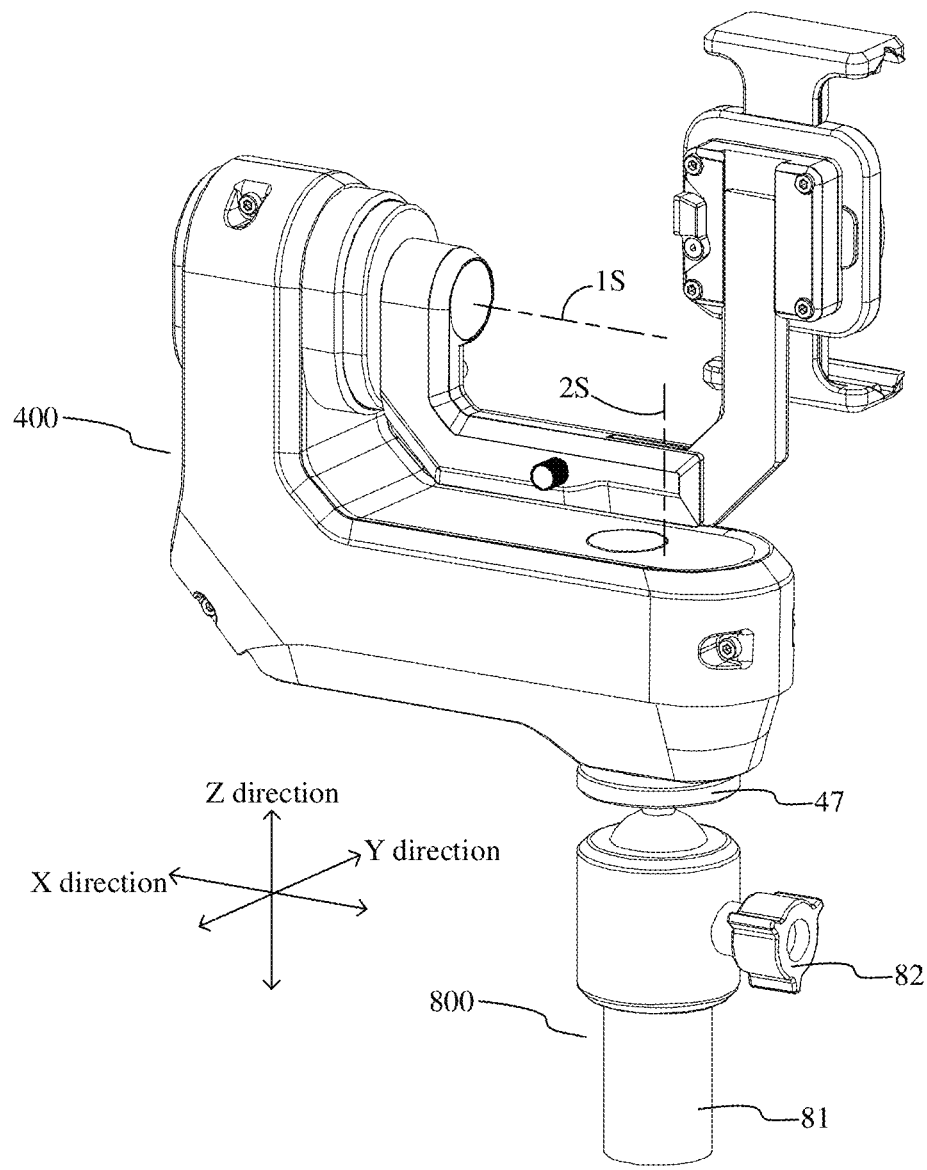
FIG. 27 is a schematic diagram of a three-dimensional structure of a stabilizer according to some embodiments of the present disclosure.

As shown in FIG. 27, according to an embodiment of the present disclosure, a stabilizer 700 is further provided, including a support frame 800 and the gimbal 400 of any one of the above-mentioned embodiments connected to the top of the support frame 800. The support frame 800 may be a support frame with a telescopic function and/or a tripod function, and the support frame 800 may also be a hand-held support frame.

In some embodiments, as shown in FIG. 27, the support frame 800 includes a rod body 81 and a third locking mechanism 82, the mounting chassis 47 is connected to the rod body 81 with a ball joint, and the rotation of the mounting chassis 47 relative to the rod body 81 may be locked by the third locking mechanism 82. In this way, the gimbal 400 may rotate in all directions relative to the support frame 800, which can meet the requirements of more shooting angles.

In summary, the gimbal and the stabilizer provided by the above-mentioned embodiments of the present disclosure can simultaneously align the lens optical center of the viewfinder camera of the mobile device with the horizontal rotation axis and the vertical rotation axis of the gimbal, thereby increasing the viewfinder range of the mobile device with the help of the gimbal and improving the shooting effect.

It should be understood that in this description, the orientation or positional relationship or size indicated by the terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", ect. are based on the orientation or positional relationship or size shown in the figures, and these terms are used only for the convenience of description, not to indicate or imply the referred device or elements must have certain orientations, be constructed and operated in certain orientations, and thus should not be construed as limiting the scope of the present disclosure.

In addition, the terms "first", "second", "third", etc. are used for descriptive purposes only, and should not be interpreted as indicating or implying relative importance or implicitly specifying the number of indicated technical features. Thus, a feature defined as "first", "second" and "third" may explicitly or implicitly includes one or more of these features. In the description of the present disclosure, "plurality" means two or more, unless otherwise specifically defined.

In this disclosure, terms such as "installation", "connection with", "connection" and "fixation" should be interpreted in a broad sense, for example, it may be a fixed connection or a detachable connection unless otherwise clearly defined and limited, or integrated; it may be a mechanical connection, an electrical connection, or a communication; it may be a direct connection or an indirect connection through an intermediary, it may be the internal communication of two elements or the interaction relationship between two elements. Those skilled in the art can understand the specific meanings of the above terms in the present disclosure according to specific situations.

In the present disclosure, unless otherwise clearly stated and limited, a first feature being "on" or "under" a second feature may include direct contact between the first and second features, and may also include the first and second features in indirect contact through another characteristic contact between them. Moreover, the first feature "on", "over" and "above" the second feature include that the first feature is directly above and obliquely above the second feature, or simply means that the first feature is horizontally higher than the second feature. The first feature "below", "beneath" and "under" the second feature include that the first feature is directly below and obliquely below the second feature, or simply means that the first feature is horizontally lower than the second feature.

This description provides many different embodiments or examples that may be used to implement the present disclosure. It should be understood that these different embodiments or examples are purely exemplary and are not intended to limit the protection scope of the present disclosure in any way. Those skilled in the art can conceive of various changes or substitutions on the basis of the disclosure content in the description of the present disclosure, and these should be covered within the protection scope of the present disclosure. Therefore, the protection scope of the present disclosure should be defined by the appended claims.

What is claimed is:

1. A clamping assembly, comprising:
a supporting member, having a snap-fit groove, wherein the snap-fit groove includes a first snap groove arranged along a first direction; and
a clamping member, configured to clamp a mobile device, wherein the clamping member includes a snap-fit structure that is detachably snap-fitted with the snap-fit groove, the clamping member includes a housing, clamping jaws and a button, the housing includes a first hole and a second hole, the clamping jaws are disposed on the housing and configured to clamp the mobile device, the button includes a button body and a tension spring connecting the button body and the housing, the button body includes a pressing part operable through the first hole and a snap part extending from the second hole, and the snap part stretches the tension spring under the action of an external force and clamps with the first snap groove.

2. The clamping assembly of claim 1, wherein
the snap-fit groove includes two first snap grooves arranged along the first direction and two second snap grooves arranged along the second direction, and the first direction is orthogonal to the second direction;
the clamping member includes two buttons arranged to each other, and the housing includes two first holes corresponding to the two buttons in one-to-one correspondence, groove openings of the snap-fit grooves of the two buttons face away from each other, the snap parts of the two buttons snap-fit with two first snap grooves in one-to-one correspondence, and snap-fit with two second snap grooves in one-to-one correspondence.

3. The clamping assembly of claim 2, wherein
the snap-fit groove has a cross shape, and includes four blocking protrusions, each blocking protrusion is located between the adjacent first snap groove and the second snap groove;
the housing includes two positioning ribs located on an edge of the second hole and arranged opposite to each other, the two positioning ribs are perpendicular to an extending direction of the snap parts of the two buttons, and when the snap parts of the two buttons snap-fit with the two first snap grooves in one-to-one correspondence or with the two second snap grooves in one-to-one correspondence, rotation of the two positioning ribs are restricted in the snap-fit groove by the four blocking protrusions.

4. The clamping assembly of claim 3, wherein sides of the two positioning ribs facing away from each other have guiding slopes.

5. The clamping assembly of claim 2, wherein
a surface of the supporting member facing the clamping member has a substantially cross-shaped positioning groove;
the housing has a substantially cross-shaped positioning protrusion, and the positioning protrusion is clamped into the positioning groove along the first direction and into the positioning groove along the second direction, and the second hole is located at a center position of the positioning protrusion.

6. The clamping assembly of claim 2, wherein
the housing is a square housing, and the two first holes are respectively located at two opposite ends of the square housing.

7. The clamping assembly of claim 6, wherein
the square housing includes two third holes, the two third holes are respectively located at the other two opposite ends of the square housing, and the clamping jaws pass through the two third holes.

8. The clamping assembly of claim 1, wherein
the pressing part is an arc-shaped pressing part; and/or
the button body and the housing are connected through the at least two tension spring.

9. The clamping assembly of claim 1, wherein
a first magnet is provided inside the supporting member, a second magnet is provided inside the housing, and the supporting member and the clamping member are magnetically adsorbed through the first magnet and the second magnet.

10. The clamping assembly of claim 1, wherein
the supporting member includes a first body and a first magnet disposed on the first body, the first body has a snap-fit groove, and a sidewall of the snap-fit groove has at least one ball snap-fit groove;
the clamping member includes a second body, a second magnet disposed on the second body and magnetically adsorbing the first magnet, clamping jaws disposed on the second body and configured to clamp the mobile device, and at least one ball screw, wherein the second body has a protruding part that is inserted into the snap-fit groove, and the at least one ball screw is arranged based on the protruding part, and the ball of each ball screw is clamped into the ball snap-fit groove.

11. The clamping assembly of claim 10, wherein
the at least one ball snap-fit groove includes at least one first ball snap-fit groove and at least one second ball snap-fit groove;
the at least one ball screw is snap-fitted with the at least one first ball snap-fit groove in one-to-one correspondence, and after clockwise or counterclockwise rotation of 90° relative to the supporting member, at least one second ball snap-fit grooves are clamped in one-to-one correspondence.

12. A gimbal, comprising:
the clamping assembly of claim 1;
a first cantilever, including a first guiding structure that provides guidance in a first guiding direction;
a second cantilever, slidably assembled with the first guiding structure, and including a second guiding structure providing guidance in a second guiding direction, wherein the second guiding direction is orthogonal to the first guiding direction, and the clamping assembly is slidably assembled with the second guiding structure;
a first locking mechanism, configured to lock the sliding of the second cantilever relative to the first guiding structure;
a second locking mechanism, configured to lock the sliding of the clamping assembly relative to the second guiding structure; and
a machine body assembly, of which the inside is provided with a first driving mechanism and a second driving mechanism, wherein the first driving mechanism is configured to drive the first cantilever to rotate around the first axis, and the second driving mechanism is configured to drive the machine body assembly to rotate around the second axis, the first axis is arranged along the first guiding direction, and the second axis is arranged along the second guiding direction.

13. The gimbal of claim 12, wherein
the first cantilever includes a first arm section extending along a first guiding direction and a second arm section extending along a second guiding direction, the first guiding structure is arranged on the first arm section, the first driving mechanism is configured to drive the second arm section to rotate around the first axis;
the second cantilever includes a third arm section extending along the first guiding direction and a fourth arm section extending along the second guiding direction, the third arm section is slidably assembled with the first guiding structure, and the second guiding structure is arranged on the fourth arm section.

14. The gimbal of claim 13, wherein
the first guiding structure includes a guiding groove provided on the first arm section, the guiding groove has a blocking part, and the third arm section includes a sliding part that is slidably assembled in the guiding groove, the sliding part has a stopping part stopping at the blocking part, and the stopping part is closer to the second arm section than the blocking part; and/or
the third arm section has a strip-shaped hole extending along the first guiding direction, and the first guiding structure includes a guiding post located in the strip-shaped hole and capable of sliding relative to the strip-shaped hole; and/or
the first arm section is provided with a threaded hole, the first locking mechanism is a fastener threadedly coupled with the threaded hole, and the fastener is screwed to a first locking position where the fastener abuts against the third arm section to restrict the third arm section from sliding relative to the first guiding structure, the fastener is screwed to a first unlocking position where the fastener is separate from the third arm section to allow the third arm section to slide relative to the first guide structure, wherein the side of the third arm section facing the fastener has a groove extending along the first guiding direction, and the fastener abuts against the groove wall of the groove at the first locking position.

15. The gimbal of claim 13, wherein the second locking mechanism is a wrench assembly provided on the clamping assembly, and the wrench assembly comprises:
a wrench, rotating to the second locking position and the second unlocking position; and
a locking block driven by the wrench, wherein when the wrench is in the second locking position, the locking block abuts against the fourth arm section to restrict the sliding of the clamping assembly relative to the fourth arm section, and when the wrench is in the second unlocking position, the locking block is separated from the fourth arm section to allow the sliding of the clamping assembly relative to the fourth arm section.

16. The gimbal of claim 15, wherein the clamping assembly has a sliding groove slidably assembled with the fourth arm section, and an accommodating cavity communicated with the sliding groove, the wrench is disposed outside the clamping assembly, and the wrench assembly further comprises:
a threaded shaft, which is coaxially and fixedly connected with the wrench through screws and extends into the accommodating cavity, wherein the locking block is threadedly coupled with the threaded shaft and is restricted from rotating with the threaded shaft by the cavity wall of the accommodating cavity, when the wrench is rotated from the second unlocking position to the second locking position, the locking block moves linearly toward the fourth arm section and abut against the fourth arm section, and when the wrench rotates from the second locking position to the second unlocking position, the locking block linearly moves away from the fourth arm section; and a spring, which is located in the accommodating chamber and is configured to apply a pre-tightening force to the locking block facing away from the wrench.

17. The gimbal of claim 16, wherein the back side of the clamping assembly has a first blocking sidewall and a second blocking sidewall configured to restrict the rotation of the wrench between the second unlocking position and the second locking position; and/or a cross section of the fourth arm section perpendicular to the second guiding direction is roughly trapezoidal, and the sliding groove is a dovetail groove; and/or the side of the locking block facing the wrench has an accommodating groove, and the spring is located in the accommodating groove.

18. The gimbal of claim 12, wherein the supporting member is magnetically connected to a clamping member, one of the supporting member and the clamping member has two rotational clamping structures arranged orthogonally, the other of the supporting member and the clamping member has a rotation positioning part, and the rotation positioning part cooperates with any one of the rotational clamping structures.

19. A stabilizer, comprising:

the gimbal of claim 12;

a mounting chassis, disposed at the bottom of the machine body assembly, wherein the second driving mechanism is configured to drive the machine body assembly to rotate relative to the mounting chassis around the second axis; and a support frame, of which the top is connected to the mounting chassis.

* * * * *